(12) United States Patent
White et al.

(10) Patent No.: US 10,482,440 B1
(45) Date of Patent: Nov. 19, 2019

(54) SIMULATING NFC EXPERIENCE

(71) Applicant: Square, Inc., San Francisco, CA (US)

(72) Inventors: Michael Wells White, San Francisco, CA (US); Mathew Wilson, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 510 days.

(21) Appl. No.: 14/859,034

(22) Filed: Sep. 18, 2015

(51) Int. Cl.
  *G06Q 20/20* (2012.01)
  *G06Q 20/38* (2012.01)
  *G07G 1/00* (2006.01)
  *G07G 1/14* (2006.01)
  *G06Q 20/32* (2012.01)

(52) U.S. Cl.
  CPC ......... *G06Q 20/202* (2013.01); *G06Q 20/204* (2013.01); *G06Q 20/3278* (2013.01); *G07G 1/0009* (2013.01); *G07G 1/0081* (2013.01); *G07G 1/14* (2013.01); *G06Q 20/382* (2013.01)

(58) Field of Classification Search
  CPC .......................... G06Q 20/382; G06Q 20/3278
  USPC .......................................................... 705/64
  See application file for complete search history.

(56) References Cited

U.S. PATENT DOCUMENTS

| | | | |
|---|---|---|---|
| 5,679,943 A | 10/1997 | Schultz et al. | |
| 6,631,165 B1 | 10/2003 | Lambert et al. | |
| 6,680,700 B2 | 1/2004 | Hilgers | |
| 7,309,012 B2 | 12/2007 | Von Mueller et al. | |
| 7,343,317 B2 | 3/2008 | Jokinen et al. | |
| 7,471,204 B2 | 12/2008 | Safarian et al. | |
| 7,813,314 B2 | 10/2010 | Fulknier et al. | |
| 7,945,494 B2 | 5/2011 | Williams | |

(Continued)

FOREIGN PATENT DOCUMENTS

| | | | | |
|---|---|---|---|---|
| WO | WO-2015128422 A1 | * | 9/2015 | ........... G07G 1/0045 |
| WO | 2016/191299 A2 | | 12/2016 | |

OTHER PUBLICATIONS

Gebhart, M., et al., "Automated Antenna Impedance Adjustment for Near Field Communication (NEC)," 12th International Conference on Telecommunications (ConTEL), pp. 235-242 (Jun. 26-28, 2013).

(Continued)

*Primary Examiner* — A. Hunter Wilder
(74) *Attorney, Agent, or Firm* — Maynard Cooper & Gale, LLP; Chitra M. Kalyanaraman, Esq.

(57) ABSTRACT

A mobile point-of-sale (POS) terminal for processing a financial transaction between a buyer and a merchant includes a first mobile computing device running a register application configured to receive payment information from the buyer for facilitating a transfer of funds from the buyer to the merchant, and a payment object reader coupled with the first mobile computing device. The payment object reader includes a wireless communication interface, a processor configured to determine the proximity of the second mobile computing device using signal strength of a signal received via the wireless communication interface. In response to the proximity of the second mobile computing device crossing a threshold, the payment object reader transmits a request to the second mobile computing device to connect with the first mobile computing device. The first mobile computing device and the second mobile computing device may then communicate payment and/or transaction information to complete a POS transaction.

23 Claims, 10 Drawing Sheets

(56) References Cited

U.S. PATENT DOCUMENTS

| | | | |
|---|---|---|---|
| 7,945,949 B2 | 5/2011 | Johnson | |
| 8,189,552 B2 | 5/2012 | Moeller | |
| 8,280,347 B2 | 10/2012 | Azimi et al. | |
| 8,297,507 B2 | 10/2012 | Kayani | |
| 8,302,860 B2 | 11/2012 | McKelvey | |
| 8,336,771 B2 | 12/2012 | Tsai et al. | |
| 8,466,830 B2 | 6/2013 | Kanamoto | |
| 8,573,486 B2 | 11/2013 | McKelvey et al. | |
| 8,798,537 B2 | 8/2014 | Lee et al. | |
| 8,804,517 B2 | 8/2014 | Oerton | |
| 8,876,003 B2 | 11/2014 | McKelvey | |
| 9,047,598 B1 | 6/2015 | McKelvey et al. | |
| 9,235,735 B2 | 1/2016 | Peters et al. | |
| 9,250,452 B1 | 2/2016 | Yap et al. | |
| 9,256,769 B1 | 2/2016 | Lamfalusi et al. | |
| 9,294,353 B2 | 3/2016 | Sewall et al. | |
| 9,306,401 B2 | 4/2016 | Lee et al. | |
| 9,396,368 B1 | 7/2016 | Lamba et al. | |
| 9,438,300 B1 | 9/2016 | Oliaei | |
| 9,443,237 B2 | 9/2016 | McKelvey et al. | |
| 9,460,322 B2 | 10/2016 | Lamfalusi et al. | |
| 9,485,092 B2 | 11/2016 | Smets et al. | |
| 9,503,178 B2 | 11/2016 | Lee et al. | |
| 9,646,299 B1 | 5/2017 | Rezayee et al. | |
| 9,760,883 B1 | 9/2017 | Wade | |
| 9,781,549 B2 | 10/2017 | Lamba et al. | |
| 9,924,513 B2 | 3/2018 | Sidhu et al. | |
| 9,936,337 B2 | 4/2018 | Lamba et al. | |
| 10,033,435 B2 | 7/2018 | Wolf et al. | |
| 10,198,727 B1 | 2/2019 | Rezayee et al. | |
| 2002/0194141 A1 | 12/2002 | Langensteiner et al. | |
| 2004/0104268 A1 | 6/2004 | Bailey | |
| 2005/0212693 A1 | 9/2005 | Friedrich | |
| 2005/0242173 A1 | 11/2005 | Suzuki | |
| 2005/0242927 A1 | 11/2005 | Friedrich | |
| 2005/0247787 A1 | 11/2005 | Von Mueller et al. | |
| 2005/0287966 A1 | 12/2005 | Yoshimi et al. | |
| 2006/0097874 A1 | 5/2006 | Salesky et al. | |
| 2006/0109123 A1 | 5/2006 | Carrender | |
| 2006/0125598 A1 | 6/2006 | Fischer et al. | |
| 2006/0125605 A1 | 6/2006 | Fischer et al. | |
| 2006/0287964 A1 | 12/2006 | Brown | |
| 2007/0025456 A1 | 2/2007 | McCrady | |
| 2007/0026826 A1 | 2/2007 | Wilson | |
| 2007/0030126 A1 | 2/2007 | Friedrich | |
| 2007/0063048 A1 | 3/2007 | Havens et al. | |
| 2007/0090927 A1 | 4/2007 | Potyrailo et al. | |
| 2007/0287498 A1 | 12/2007 | Wang et al. | |
| 2008/0177662 A1 | 7/2008 | Smith et al. | |
| 2008/0237345 A1 | 10/2008 | Moullette et al. | |
| 2008/0246667 A1 | 10/2008 | Symons | |
| 2009/0215394 A1 | 8/2009 | Dewan | |
| 2010/0148928 A1 | 6/2010 | Yeager et al. | |
| 2010/0191653 A1 | 7/2010 | Johnson et al. | |
| 2010/0201314 A1 | 8/2010 | Toncich et al. | |
| 2010/0277003 A1 | 11/2010 | Von Novak et al. | |
| 2010/0314446 A1 | 12/2010 | Morley, Jr. | |
| 2011/0086601 A1 | 4/2011 | Ali et al. | |
| 2011/0112920 A1 | 5/2011 | Mestre et al. | |
| 2011/0160896 A1 | 6/2011 | Kim | |
| 2011/0165896 A1 | 7/2011 | Stromberg et al. | |
| 2011/0174879 A1 | 7/2011 | Morley, Jr. | |
| 2011/0198395 A1 | 8/2011 | Chen | |
| 2012/0086284 A1 | 4/2012 | Capanella et al. | |
| 2012/0095867 A1 | 4/2012 | McKelvey | |
| 2012/0095870 A1 | 4/2012 | McKelvey | |
| 2012/0193434 A1 | 8/2012 | Grigg et al. | |
| 2012/0203610 A1 | 8/2012 | Grigg et al. | |
| 2012/0271725 A1 | 10/2012 | Cheng | |
| 2013/0035051 A1 | 2/2013 | Mujtaba et al. | |
| 2013/0040560 A1 | 2/2013 | Kennedy et al. | |
| 2013/0073373 A1* | 3/2013 | Fisher | G06Q 20/20 705/14.38 |
| 2013/0084798 A1 | 4/2013 | Faithom | |
| 2013/0084803 A1 | 4/2013 | Hall et al. | |
| 2013/0109312 A1 | 5/2013 | Witschnig et al. | |
| 2013/0109446 A1 | 5/2013 | Phillips | |
| 2013/0137371 A1 | 5/2013 | Haverinen | |
| 2013/0248601 A1 | 9/2013 | Liang et al. | |
| 2013/0325712 A1 | 12/2013 | Park et al. | |
| 2014/0001263 A1* | 1/2014 | Babu | G06F 1/3215 235/440 |
| 2014/0052637 A1* | 2/2014 | Jooste | G06Q 20/32 705/44 |
| 2014/0061301 A1 | 3/2014 | Cho et al. | |
| 2014/0101056 A1 | 4/2014 | Wendling | |
| 2014/0127995 A1 | 5/2014 | Hendricksen et al. | |
| 2014/0129425 A1 | 5/2014 | Yang et al. | |
| 2014/0138435 A1 | 5/2014 | Khalid | |
| 2014/0187153 A1 | 7/2014 | Zhu et al. | |
| 2014/0279546 A1 | 9/2014 | Poole et al. | |
| 2014/0302788 A1 | 10/2014 | McKelvey | |
| 2014/0323041 A1 | 10/2014 | Shana'a et al. | |
| 2014/0328488 A1 | 11/2014 | Caballero et al. | |
| 2015/0044964 A1 | 2/2015 | Khan et al. | |
| 2015/0118956 A1 | 4/2015 | Desai et al. | |
| 2015/0162785 A1 | 6/2015 | Lee et al. | |
| 2015/0186874 A1 | 7/2015 | Govindarajan et al. | |
| 2015/0195008 A1* | 7/2015 | Johnson | H04B 5/0031 455/41.2 |
| 2015/0221149 A1 | 8/2015 | Main et al. | |
| 2015/0249485 A1 | 9/2015 | Ouyang et al. | |
| 2015/0264554 A1 | 9/2015 | Addepalli et al. | |
| 2015/0287022 A1 | 10/2015 | Granbery | |
| 2015/0332240 A1* | 11/2015 | Harwood | G06Q 20/202 705/21 |
| 2015/0332248 A1 | 11/2015 | Weksler et al. | |
| 2015/0341073 A1 | 11/2015 | Ayala Vazquez et al. | |
| 2015/0355251 A1 | 12/2015 | Pascolini | |
| 2016/0012430 A1 | 1/2016 | Chandrasekaran et al. | |
| 2016/0050629 A1 | 2/2016 | Khesbak et al. | |
| 2016/0126619 A1 | 5/2016 | Tenbroek et al. | |
| 2016/0142174 A1 | 5/2016 | Fine et al. | |
| 2016/0147239 A1 | 5/2016 | Yan et al. | |
| 2016/0156327 A1 | 6/2016 | Wang | |
| 2016/0210613 A1 | 7/2016 | McGill | |
| 2016/0232515 A1* | 8/2016 | Jhas | G06Q 30/02 |
| 2016/0249157 A1 | 8/2016 | Fine | |
| 2016/0371716 A1* | 12/2016 | Aitenbichler | G06Q 30/0233 |
| 2017/0004475 A1 | 1/2017 | White et al. | |
| 2017/0200152 A1* | 7/2017 | Winkler | G06Q 20/367 |
| 2017/0290079 A1* | 10/2017 | Raj | H04W 76/023 |
| 2017/0344976 A1 | 11/2017 | Lee | |
| 2018/0097531 A1 | 4/2018 | Kummaraguntla | |
| 2018/0295489 A1 | 10/2018 | Lamba et al. | |

OTHER PUBLICATIONS

Hao, H., et al., "A Parallel Topology for Inductive Power Transfer Power Supplies," IEEE Transactions on Power Electronics, vol. 29, No. 3, pp. 1140-1151 (Mar. 2014).

Non-Final Office Action dated Apr. 10, 2015 for U.S. Appl. No. 14/189,997, of Lamfalusi, M., et al., filed Feb. 25, 2014.

Non-Final Office Action dated Apr. 13, 2015, for U.S. Appl. No. 14/641,080, of McKelvey, J., M., et al., filed Mar. 6, 2015.

Notice of Allowance dated Aug. 18, 2015, for U.S. Appl. No. 14/641,080, of McKelvey, J., M., et al., filed Mar. 6, 2015.

Non-Final Office Action dated Nov. 20, 2015, for U.S. Appl. No. 14/641,080, of McKelvey, J.M., et al., filed Mar. 6, 2015.

Notice of Allowance dated Nov. 23, 2015 for U.S. Appl. No. 14/189,997, of Lamfalusi, M., et al., filed Feb. 25, 2014.

Non-Final Office Action dated Nov. 25, 2015, for U.S. Appl. No. 14/868,261, of Lamba, K, et al., filed Sep. 28, 2015.

Non-Final Office Action dated Jan. 6, 2016, for U.S. Appl. No. 14/866,128, of Rezayee, A., et al., filed Sep. 25, 2015.

Non-Final Office Action dated Feb. 25, 2016, for U.S. Appl. No. 14/979,407, of Lamfalusi, M., et al., filed Dec. 27, 2015.

Final Office Action dated Mar. 9, 2016, for U.S. Appl. No. 14/641,080, of McKelvey, J. M., et al., filed Mar. 6, 2015.

Notice of Allowance dated Mar. 18, 2016, for U.S. Appl. No. 14/868,261, of Lamba, K., et al., filed Sep. 28, 2015.

(56) References Cited

OTHER PUBLICATIONS

Notice of Allowance dated May 23, 2016, for U.S. Appl. No. 14/641,080, of McKelvey, J.M., et al., filed Mar. 6, 2015.
Notice of Allowance dated Jun. 13, 2016, for U.S. Appl. No. 14/979,407, of Lamfalusi, M., et al., filed Dec. 27, 2015.
Non-Final Office Action dated Aug. 5, 2016, for U.S. Appl. No. 14/866,128, of Rezayee, A., et al., filed Sep. 25, 2015.
Non-Final Office Action dated Oct. 25, 2016, for U.S. Appl. No. 14/868,247, of Lamba, K., et al., filed Sep. 28, 2015.
Non-Final Office Action dated Dec. 8, 2016, for U.S. Appl. No. 14/986,308, of Wade, J., filed Dec. 31, 2015.
Notice of Allowance dated Jan. 11, 2017, for U.S. Appl. No. 14/866,128, of Rezayee, A., et al., filed Sep. 25, 2015.
Non-Final Office Action dated Jan. 25, 2017, for U.S. Appl. No. 15/094,598, of Lamba, K., et al., filed Apr. 8, 2016.
Final Office Action dated Mar. 21, 2017, for U.S. Appl. No. 14/868,247, of Lamba, K, et al., filed Sep. 28, 2015.
Notice of Allowance dated Apr. 28, 2017, for U.S. Appl. No. 14/986,308, of Wade, J., filed Dec. 31, 2015.
Advisory Action dated May 26, 2017, for U.S. Appl. No. 14/868,247, of Lamba, K., et al., filed Sep. 28, 2015.
Notice of Allowance dated May 31, 2017, for U.S. Appl. No. 15/094,598, of Lamba, K., et al., filed Apr. 8, 2016.
Corrected Notice of Allowance dated Aug. 10, 2017, for U.S. Appl. No. 14/986,308, of Wade, J., filed Dec. 31, 2015.
Notice of Allowance dated Nov. 20, 2017, for U.S. Appl. No. 14/868,247, of Lamba, K., et al., filed Sep. 28, 2015.
Non-Final Office Action dated Apr. 20, 2018, for U.S. Appl. No. 14/858,940, of Grassadonia, B., et al., filed Sep. 18, 2015.
Non-Final Office Action dated May 17, 2018, for U.S. Appl. No. 14/865,789, of Rezayee, A., et al., filed Sep. 25, 2015.
International Search Report and Written Opinion for International Patent Application No. PCT/US2016/033601, dated Nov. 22, 2016.
Notice of Allowance dated Sep. 19, 2018, for U.S. Appl. No. 14/865,789, of Rezayee, A., et al., filed Sep. 25, 2015.
Ryan, P., "Plug and Pay: A Gallery of 26 Mobile Card Readers," Aug. 20, 2013, Retrieved from the Internet URL:http://bankinnovation.net/2013/08/plug-and-pay-a-gallery-of-26-mobile-card-readers/, on Feb. 19, 2015, pp. 1-12.
Non-Final Office Action dated Dec. 21, 2018, for U.S. Appl. No. 15/692,995, of He, Y., et al., filed Aug. 31, 2017.
Non-Final Office Action dated Jan. 2, 2019, for U.S. Appl. No. 14/858,974, of Hernandez, M., et al., filed Sep. 18, 2015.
Non-Final Office Action dated Feb. 6, 2019, for U.S. Appl. No. 15/941,795, of Lamba, K., et al., filed Mar. 30, 2018.
Final Office Action dated Feb. 25, 2019, for U.S. Appl. No. 14/858,940, of Grassadonia, B., et al., filed Sep. 18, 2015.
Non-Final Office Action dated Apr. 18, 2019, for U.S. Appl. No. 14/864,403, of Rezayee, A., filed Sep. 24, 2015.
Notice of Allowance dated May 22, 2019, for U.S. Appl. No. 15/692,995, of He, Y., et al., filed Aug. 31, 2017.
Advisory Action dated Jun. 14, 2019, for U.S. Appl. No. 14/858,940, of Grassadonia, B., et al., filed Sep. 18, 2015.
Final Office Action dated Jun. 24, 2019, for U.S. Appl. No. 15/941,795, of Lamba, K., et al., filed Mar. 30, 2018.
Final Office Action dated Jul. 11, 2019, for U.S. Appl. No. 14/858,974, of Hernandez, M., et al., filed Sep. 18, 2015.

\* cited by examiner

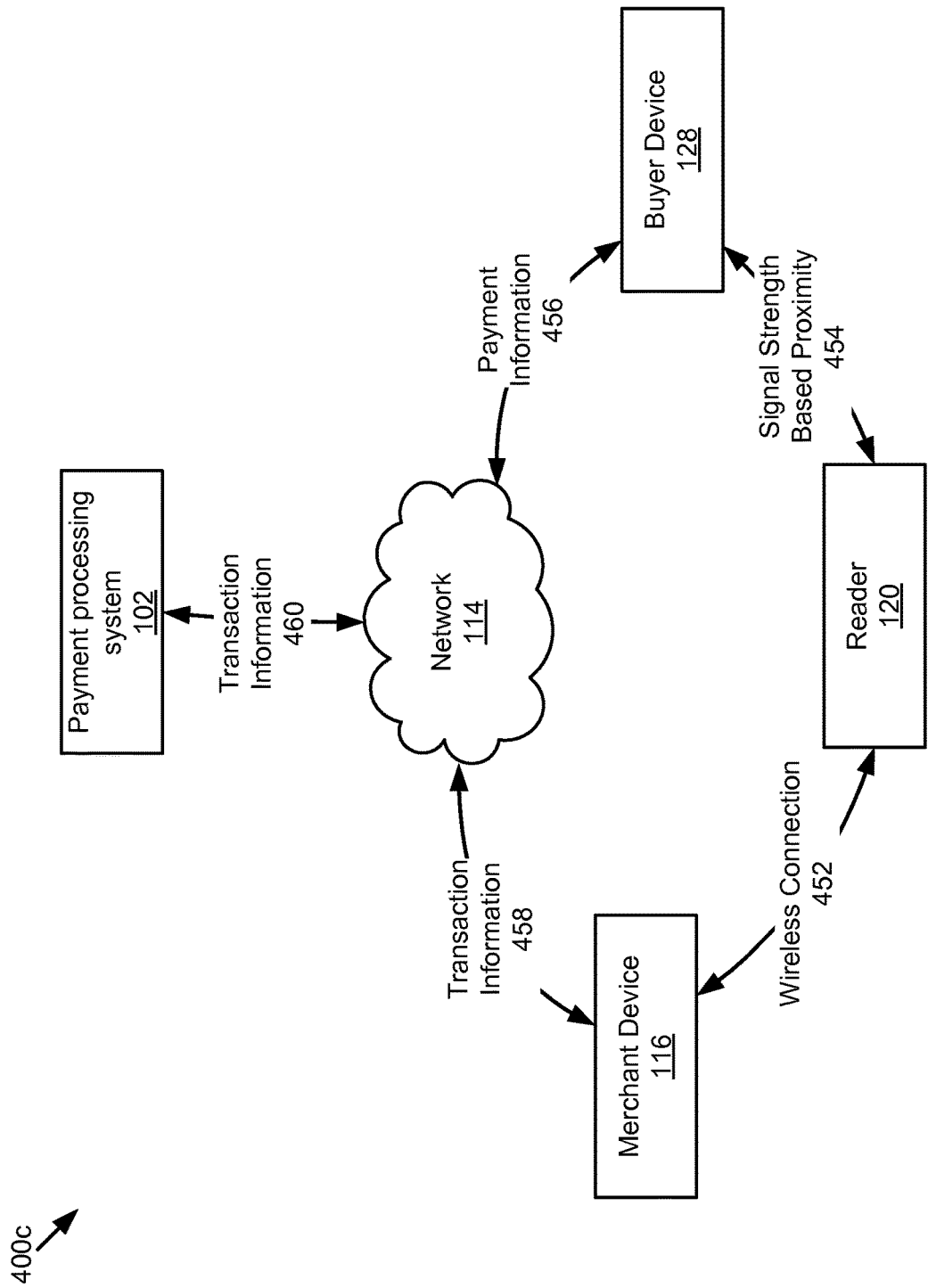

US 10,482,440 B1

SIMULATING NFC EXPERIENCE

BACKGROUND

Buyers and merchants are increasingly learning and expecting to participate in point of sale (POS) transactions using mobile computing devices. A popular method of performing a POS transaction using mobile devices includes tapping a buyer's mobile computing device on a POS terminal in a near field communication (NFC) enabled financial transaction. However, many mobile devices lack NFC capability and are therefore unable to participate in NFC tap-to-pay transactions.

BRIEF DESCRIPTION OF THE DRAWINGS

The techniques described herein are illustrated by way of example, and not by way of limitation, in the figures of the accompanying drawings, in which like reference numerals are used to refer to similar elements.

FIGS. 4A-4C are data flow diagrams depicting example data flows among a merchant device, a reader device, a buyer device, a network, and a payment processing system.

DETAILED DESCRIPTION

Figure 1:
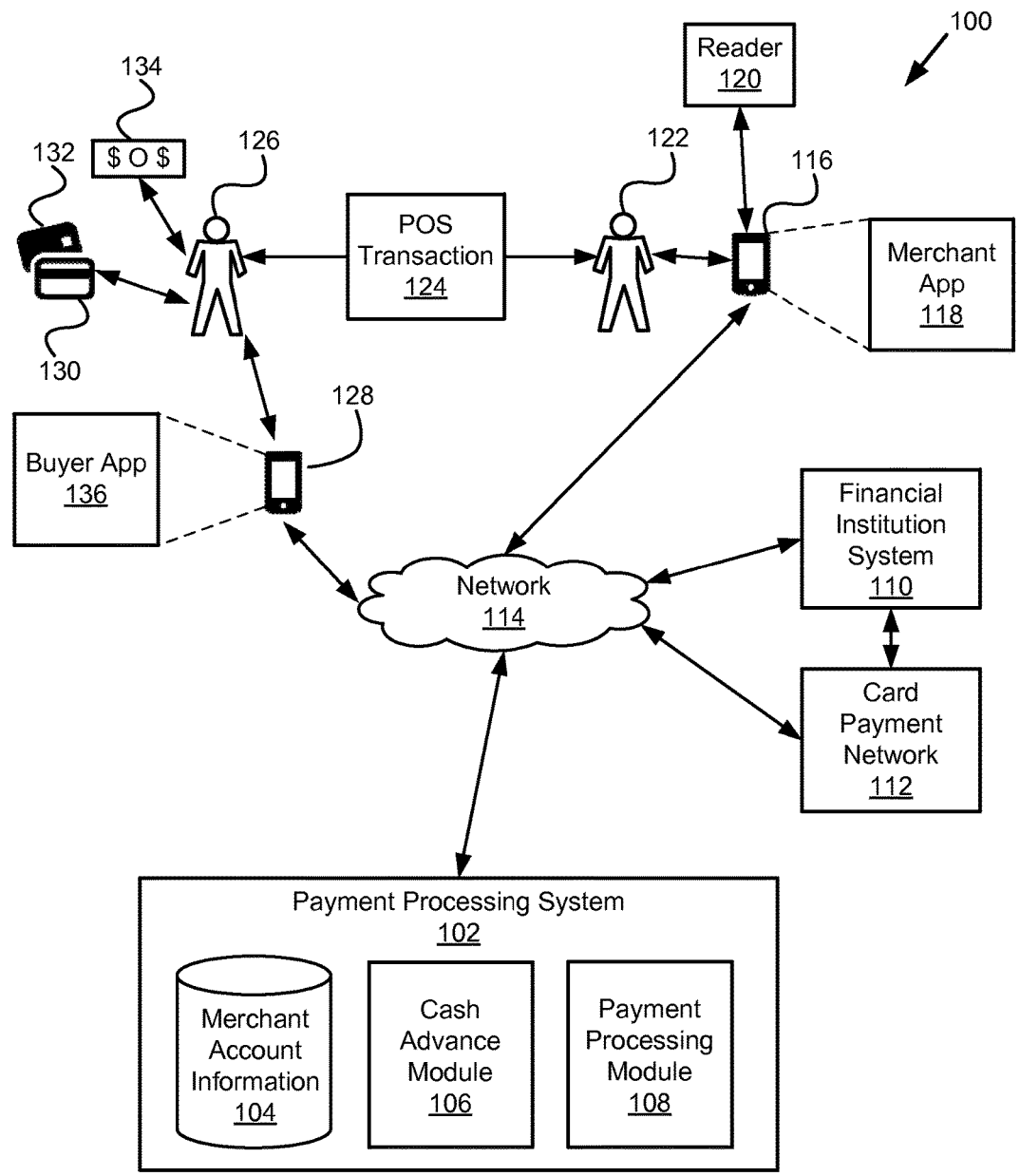
FIG. 1 illustrates an example architecture of a payment communication system for enabling point-of-sale (POS) transactions between merchants and buyers.

Systems, devices, methods, and non-transitory computer-readable media disclosed in accordance with various implementations of the techniques disclosed herein overcome one or more deficiencies in conventional approaches to point of sale systems. In particular, the techniques provide for a simulated near field communication (NFC) payment service when computing devices do not include an NFC capability or a user desires to bypass the NFC capability. Other advantages, variations, and functions are described and suggested below.

In some point of sale transactions, buyers are able to pay merchants using near field communication (NFC). Some payment cards, such as credit cards and debit cards, include an NFC chip that allows a buyer to tap-to-pay, e.g., tap the card on a NFC enabled payment terminal thereby causing payment information to be transferred to the payment terminal and funds to be transferred from a financial account of the buyer to the merchant. Similarly, some mobile devices (e.g., smartphones, smartwatches, etc.) are equipped with NFC hardware that enables the mobile devices to communicate with other NFC devices. Buyers are becoming increasingly accustomed to being able to tap their NFC enabled mobile devices (buyer devices) on NFC enabled point of sale (POS) terminals to perform such NFC transactions.

In some instances, a buyer is not able to or does not wish to participate in an NFC transaction, but may still desire or expect the tap-to-pay experience. There are numerous potential reasons that a buyer is not able to or does not wish to use an NFC type payment. In some instances, the buyer device is not NFC enabled (e.g., lacking the hardware, not having been set up or turned on, etc.). In some instances, a buyer device includes NFC capability, but the buyer does not desire to use an NFC payment service (e.g., the service lacks the buyer's preferred payment card, the NFC service has higher interest or transaction rates, etc.). The techniques and devices described herein simulate an NFC experience for such a user by determining a proximity based on wireless signal strength between a buyer device and a payment object reader and wirelessly communicate payment information based on a threshold proximity being reached. In particular, some implementations described herein may use one or more Bluetooth® communication channels to simulate the NFC experience.

In an illustrative example, a buyer and a merchant wish to perform a POS transaction and the buyer desires to pay using one or more virtual payment objects stored on a buyer device. In particular, the buyer desires a tap-to-pay experience using the POS terminal of the merchant but is not able to or does not desire to use NFC. The techniques described herein allow the merchant to provide a tap-to-pay experience without using NFC.

The buyer may indicate to the merchant that the buyer desires a tap-to-pay experience but cannot or does not want to use NFC capabilities of the reader device. The merchant provides input to a merchant device or a reader to initiate a simulated NFC payment. Similarly, the buyer may launch a buyer application on the buyer device, which transmits a signal to a reader device that the buyer desires a tap-to-pay experience without using NFC capabilities of the reader device.

The tap-to-pay experience is created by determining proximity of the buyer device to the reader device based on the strength of a wireless signal (e.g., Bluetooth®) transmitted between the buyer device and the reader device. Once a threshold proximity between the reader and the buyer device is reached, the buyer device transmits payment information, including a chargeable entity (e.g., credit card information, a payment token, information identifying a buyer, etc.) to the merchant device or a payment processing system. The payment information may be sent via one of a number of wireless communication channels, such as between the buyer device and the merchant device, the reader, or a payment processing system.

FIG. 1 illustrates an example architecture of a payment communication system 100 for enabling point-of-sale (POS) transactions between merchants 122 and buyers 126. In the example of FIG. 1, a buyer 126 can use any of a variety of physical or virtual payment objects when participating in a POS transaction 124 with a merchant 122. In some implementations, a payment object may include one or more of cash, a virtual payment card with information stored on a buyer device 128, payment cards 130, 132 such as credit cards, debit cards, prepaid cards, and the like, that the buyer 126 can use for conducting a POS transaction 124. In some implementations, the payment cards 130 can include one or more magnetic stripes for providing payment object and buyer information when swiped in a reader 120 communicatively coupled to a merchant device 116. In some implementations, other types of payment objects can be used, for example smart cards 132 having a built in integrated circuit including a memory chip (i.e., EMV payment cards), a radio frequency identification tag (i.e., near field communication enabled payment cards), and the like. In some implementations, the user 126 can use the user device 128 to conduct payment transactions through communication between the user device 128 and the reader device 120. For example, the user device 128 may transmit payment object data (e.g., digital credit, debit, or other financial information) to the reader 120 or merchant device 116.

The payment communication system 100 in the example of FIG. 1 illustrates a merchant device 116 associated with the merchant 122 that participates in the payment service provided by the service provider of the payment processing system 102. The merchant device 116 can be a computing device (e.g., a mobile computing device) able to communicate with the payment processing system 102, the reader 120, the buyer device 128, and with various other computing devices, through suitable communication protocols, interfaces, and networks, including network 114. Further, the merchant device 116 can be any appropriate device operable to send and receive requests, messages, or other types of information over the network 114 or over one or more wireless communication channels. Additionally, while only a single merchant device 116 is illustrated in the example of FIG. 1, in some implementations there can be additional merchant devices depending on the number of merchants participating in the payment service, or a plurality of components arranged as a POS system.

Each merchant device 116 can include an instance of a merchant application 118 executed on the merchant device. The merchant application 118 can provide POS functionality to enable the merchant 122 to accept payments at a POS location using the merchant device 116. In some types of businesses, the POS location can correspond to a store or other place of business of the merchant, and thus, can be a fixed location that typically does not change on a day-to-day basis. In other types of businesses, however, the POS location can change from time to time, such as in the case that the merchant 122 operates a food truck, is a street vendor, a cab driver, or has an otherwise mobile business, e.g., in the case of merchants who sell items at buyers' homes, buyers' places of business, etc.

The merchant device 116 is communicatively coupled to a reader 120, either by direct connection, for example through an audio jack of the mobile phone connected to an audio plug of the reader, or through wireless connection, such as Wi-Fi, Bluetooth®, BLE (Bluetooth low energy), NFC, or other appropriate short-range communication. In some implementations, the reader can read data from a magnetic stripe card or an EMV chip-type card and communicate the data to the mobile phone. In some implementations, the reader can also read data from an NFC device and communicate the data to the merchant device 116. In some implementations, the reader may simulate an NFC experience using other wireless communication, such as Wi-Fi, Bluetooth®, BLE (Bluetooth low energy) according to the techniques described herein.

Accordingly, the merchant 122 and the buyer 126 can conduct a POS transaction 124 by which the buyer 126 acquires an item or service from the merchant 122 at a POS location. The merchant application 118 on the merchant device 116 can send transaction information to the payment processing system 102, for example, as the transaction is being conducted at the POS location. In some implementations, such as if a particular merchant device 116 is not connected to the network 114 and is therefore processing transactions offline, the transaction information can be sent in a batch at a subsequent point in time or using other suitable techniques. The transaction information can include information regarding the time, place, and the amount of each respective transaction, information related to the item acquired, payment object information, as well as additional information, such as buyer information. For instance, the transaction information can include payment information associated with the buyer device or stored in the payment card, e.g., cardholder name, card number, and other card/financial information. In addition, when completing the transaction a buyer can sometimes provide a receipt email address for receiving a receipt through email. Other examples of transaction information that can be captured include detailed item information, e.g., an itemized listing of the items or services being acquired, the price being paid for each item or service, descriptors of the items or services (e.g., size, flavor, color, etc.), geolocation data indicating a geographic POS location of a particular transaction, online/offline card data, data describing the merchant, e.g., a merchant identifier, a merchant category code (MCC), data describing a buyer, any type of data that is received upon a buyer's authentication into a social network, if any, and various other types of information.

In some implementations, the payment processing system 102 can also be configured to communicate with a computer system of a card payment network 112, e.g., MasterCard®, VISA®, etc., over the network 114, for example, to conduct electronic financial transactions. The computer system of the card payment network 112 can communicate with a computer system of a card issuer 110, e.g., a bank. There can be computer systems of other entities, e.g., the card acquirer, between the payment system and the computer system of the card issuer.

The payment processing system 102 can then communicate with the computer system of a card payment network 112 to complete an electronic financial transaction for the total amount to be billed to the buyer's financial account. Once the electronic financial transaction is complete, the payment processing system 102 can communicate data describing a card-less payment transaction to the buyer device 128, e.g., an electronic receipt, which can, for example, notify the buyer of the total amount billed to the buyer for the card-less payment transaction with the particular merchant.

As used herein, a financial transaction is a transaction that is conducted between a buyer and a merchant at a point-of-sale. When paying for a financial transaction, the buyer can provide the merchant with a payment object for the amount that is due. The merchant 122 can interact with a point-of-sale device, e.g., merchant device 116, to process the financial transaction. During financial transactions, the merchant device 116 can collect data describing the financial transaction, including, for example, the amount of payment received from buyers.

To accept electronic payments using the POS system 100, the merchant 122 typically creates a merchant account with the payment processing system 102 by providing information describing the merchant including, for example, merchant name, contact information (e.g., telephone numbers, the merchant's address, merchant device information, data describing the merchant device 116, wireless address, wireless connection information, security information, and/or one or more financial accounts to which funds collected from buyers will be deposited). This merchant information can be securely stored by the service provider, for example, as merchant account information 106 in a secure database. Further, the merchant information can include a merchant profile created for each merchant. The merchant profile can include information about the merchant 122 and transaction information associated with transactions conducted by the merchant.

The payment processing system 102 enables a service provider to provide a payment service in which merchants 122 are able to conduct POS transactions 124 with a plurality of buyers 126, such as for selling services and/or products to the buyers 126. The payment processing system 102 can include one or more servers that are configured to process secure electronic financial transactions, e.g., payment during a POS transaction 124, by communicating with the merchant device 116, buyer device 128, card payment networks 112, and bank or other financial institution payment systems 110. The payment processing system 102 includes a payment processing module 108 that receives transaction information for processing payments made through the merchant application 118. For example, the payment processing module 108 can receive transaction information, such as an amount of the transaction, and can verify that a particular payment object (e.g., a payment card 130, 132, virtual payment object, or other financial account associated with a buyer 126) can be used to pay for the transaction, such as by contacting a card clearinghouse of a card payment network 112. Furthermore, in some examples, the payment processing module 108 can redirect payment information for transactions to be made using payment objects to a bank, or other financial institution payment system 110. In other implementations, the merchant device 116 can communicate directly with an appropriate card payment network 112 or bank payment system 110 for approving or denying a transaction using a particular payment object for a POS transaction 124.

As introduced above, the payment processing system 102 can be configured to communicate with one or more systems of a card payment network 112 (e.g., MasterCard®, VISA®, etc.) over the network 114 to conduct financial transactions electronically. The payment processing system 102 can also communicate with one or more bank payment systems 110 of one or more banks over the network 114. For example, the payment processing system 102 can communicate with an acquiring bank, a payment card issuing bank, and/or a bank maintaining buyer accounts for electronic payments.

A payment card acquiring bank can be a registered member of a card association (e.g., Visa®, MasterCard®, etc.), and can be part of a card payment network 112. A payment card issuing bank can issue virtual payment cards (e.g., for use in a card-less payment transaction as discussed elsewhere herein) or physical payment cards 130, 132 to buyers 126, and can pay acquiring banks for purchases made by cardholders to which the issuing bank has issued a payment card 130, 132. Accordingly, in some implementations, the systems of an acquiring bank can be included in the card payment network 112 and can communicate with systems of a payment card issuing bank to obtain payment. Further, in some implementations, bank payment systems 110 can include systems associated with debit card issuing institutions, in which case, the systems of the debit card issuing institution can receive communications regarding a transaction in which the buyer uses a debit card instead of a credit card. Additionally, there can be systems of other financial institutions involved in some types of transactions or in alternative system architectures, and thus, the foregoing are merely several examples.

The network 114 can be a conventional type, wired or wireless, and can have numerous different configurations including a star configuration, token ring configuration, or other configurations. Furthermore, the network 114 can include an intranet, a local area network (LAN), a wide area network (WAN) (e.g., the Internet), and/or other interconnected data paths across which multiple devices can communicate. In some implementations, the network 114 can be a peer-to-peer network. The network 114 can also be coupled with or include portions of a telecommunications network for sending data using a variety of different communication protocols. In some implementations, the network 114 can include Bluetooth® (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the example of FIG. 1 illustrates one network 114 coupled to the merchant device 116, buyer device 128, payment processing system 102, card payment network 112, and financial institution system 110, more than one network 114 can connect these entities. The payment processing system 102, the merchant device 116, and the user device 128 can communicate over the network using wired or wireless connections, or combinations thereof.

In some implementations, the payment processing system 102 is configured to accept card-less payment transactions from buyers. As used herein, a card-less payment transaction is a transaction conducted between the buyer and a merchant at the point-of-sale during which a financial account of the buyer is charged without the buyer having to physically present a financial payment card to the merchant at the point-of-sale. In some forms of card-less payment, the merchant need not receive any details about the financial account, e.g., the credit card issuer or credit card number, for the transaction to be processed. For example, a buyer device 128 may transfer a token identifying that buyer without sending actual payment card information. Generally, when a buyer and a merchant enter into an electronic financial transaction, the transaction is processed by transferring funds from a financial account associated with the user account to a financial account associated with the merchant account. In some forms of card-less payment, the buyer device 128 presents payment information to the merchant 122 by communicating with the reader 120, e.g., NFC transactions or NFC simulated transactions according to the techniques described herein.

Before conducting card-less payment transactions of the type that does not require that the merchant POS receive financial account details from buyer 126, in one embodiment, the buyer may a user account with the payment processing system 102. The buyer can create the user account, for example, by interacting with a buyer application 136 that is configured to perform card-less payment transactions and that is running on the user device. When creating a user account with the payment processing system 102, the buyer will provide information describing the buyer including data describing a financial account of the buyer, e.g., credit card number, expiration date, and a billing address. This user information can be securely stored by the payment processing system 102, for example, in a user information 104 database. To accept card-less payment transactions, the merchant typically creates a merchant account with the payment system by providing information describing the merchant including, for example, a merchant name, contact information, e.g., telephone numbers, the merchant's geographic location address, and one or more financial accounts to which funds collected from users will be deposited. This merchant information can be securely stored by the payment system, for example, in a merchant information database.

In some examples, a buyer 126 may have a buyer device 128 that can execute a buyer application 136. For instance, some buyers 126 may carry buyer devices 128, such as smart phones, tablet computers, wearable computing devices, or the like, and some of these buyer devices 128 may have installed thereon the buyer application 136. The buyer application 136 may include electronic payment capability, which enables the buyer 126 to make a payment to the merchant using the buyer application 136, rather than paying with a physical payment card, cash, check, etc. The buyer application 136 may further enable the buyer 126 to check in with the particular merchant, e.g., at the merchant's store or prior to entering the merchant's store, such as to place an order for an item.

Figure 4A:
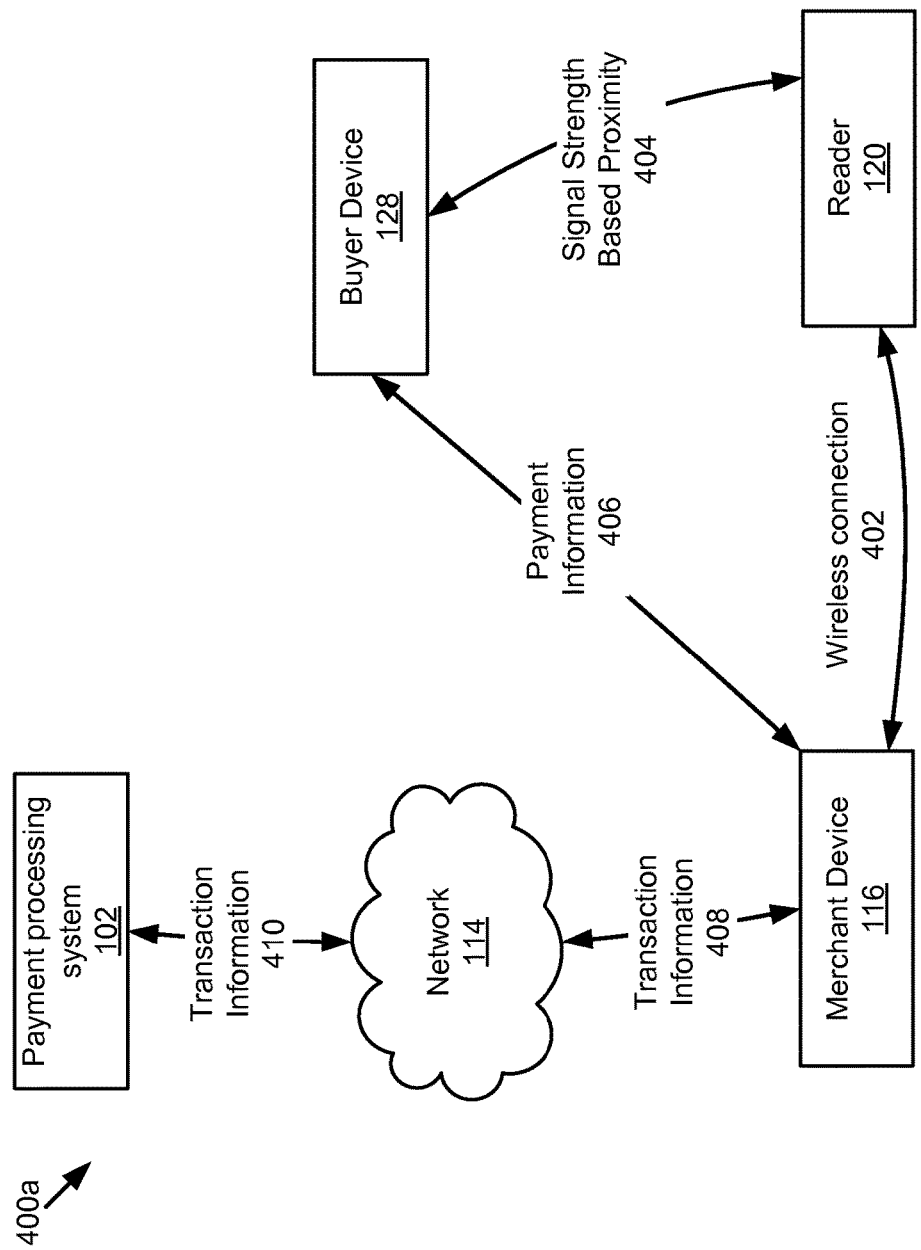
Figure 4B:
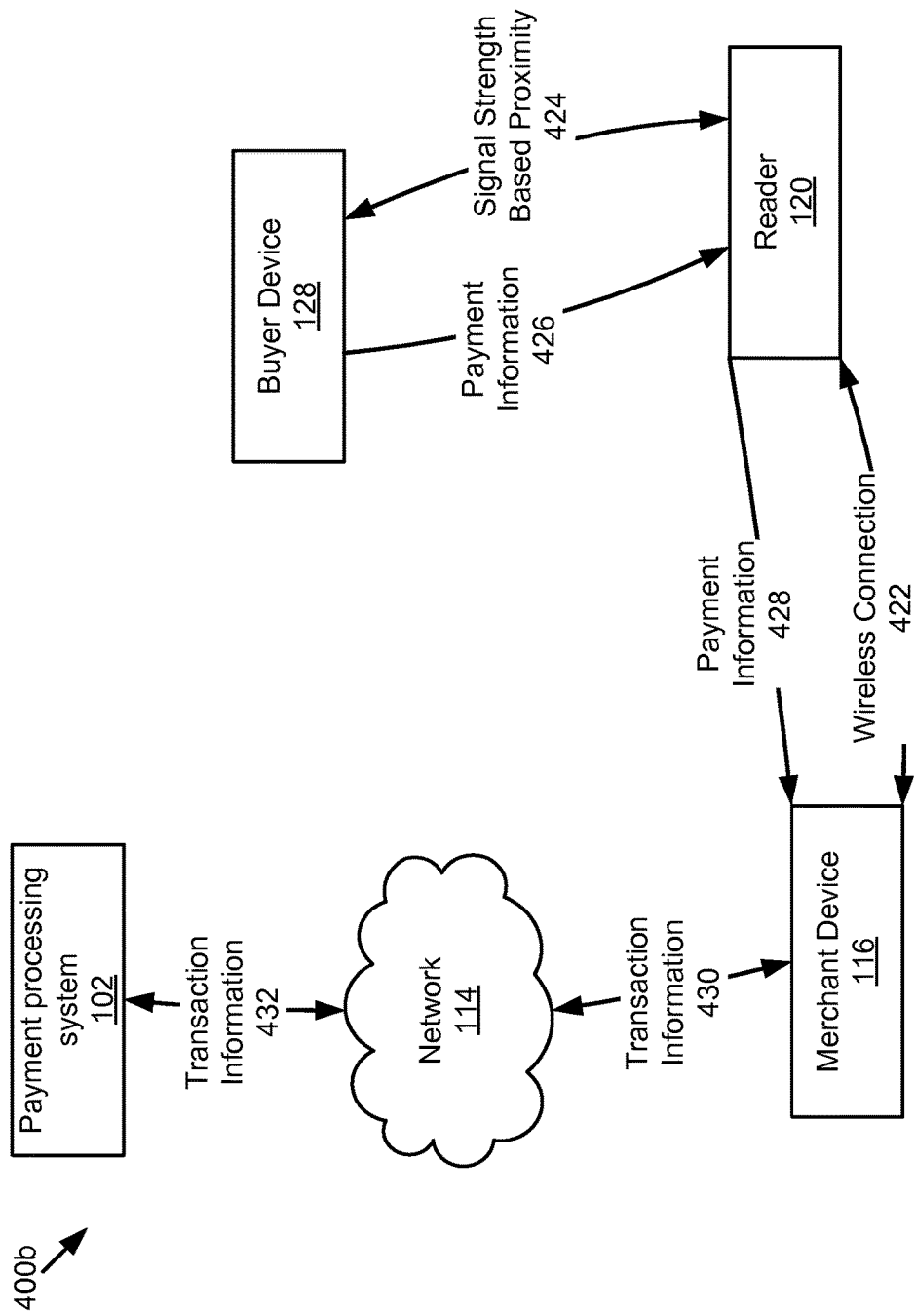

Accordingly, the merchant 122 and the buyer 126 may conduct a transaction by which the buyer 126 acquires an item from the merchant 122 in the POS transaction 124. In some implementations, the buyer device 128 includes an NFC capability configured to communicate with another device, such as the reader 120, to perform an NFC transaction. For example, a buyer may tap an NFC enabled buyer device 128 on an NFC enabled reader 120 to transfer payment information, which may be encrypted or tokenized, in order to complete a POS transaction 124. In some implementations, the buyer device 128 doesn't include an NFC capability or the buyer 126 doesn't wish to use the NFC capability. In such instances, components of the payment communication system 100 may work together to simulate an NFC tap-to-pay experience. For example, FIGS. 4A-4C illustrate example methods of simulating an NFC transaction experience according to the techniques described herein.

Figure 2:
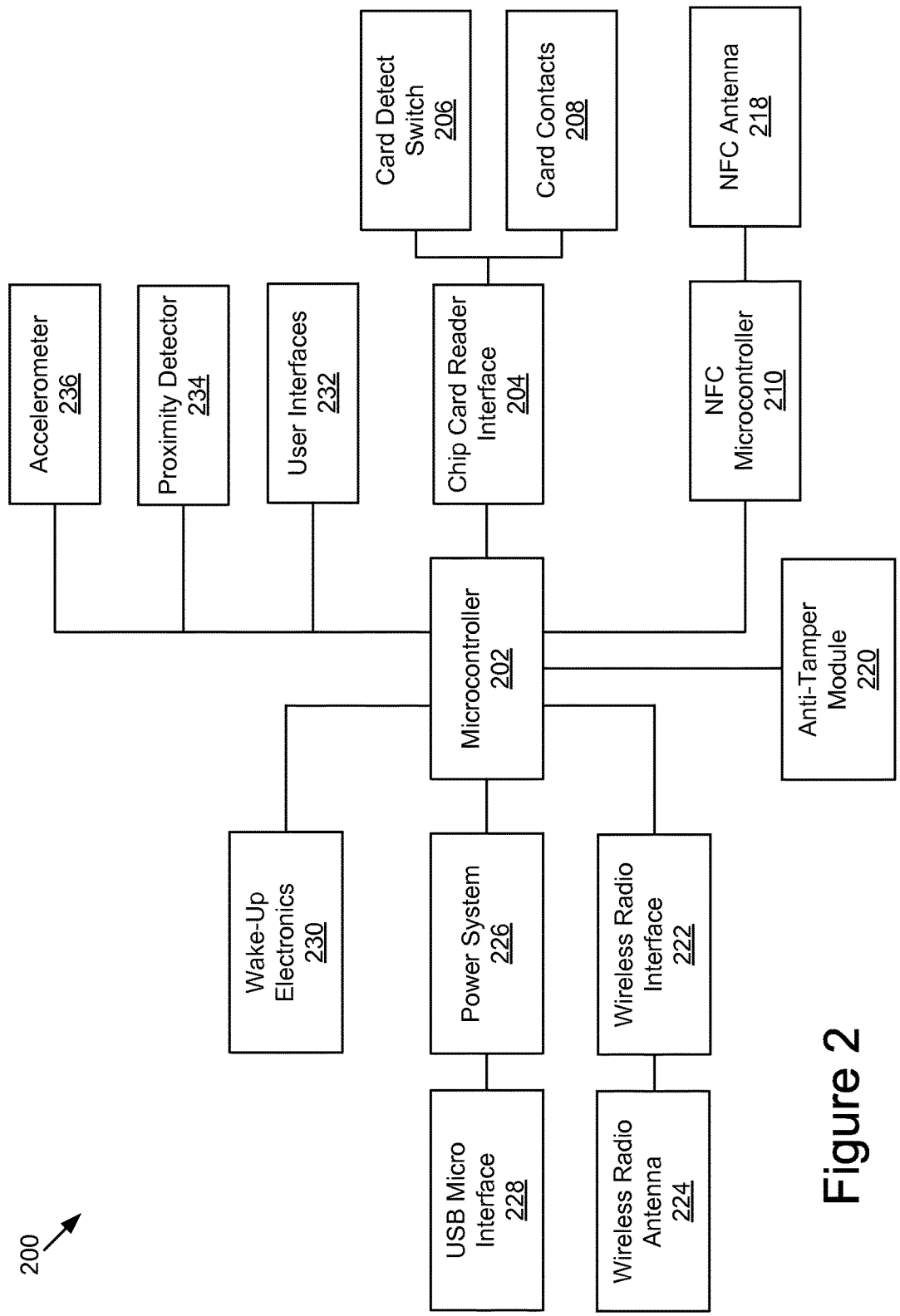
FIG. 2 illustrates an example schematic block diagram of the components of a reader device.

FIG. 2 illustrates an example schematic block diagram of the components of a reader device 200 such as the reader 120. The reader device 200 includes microcontroller 202 configured to manage functions between various components within the device. Coupled to microcontroller 202 is the chip card reader interface 204, which in turn is connected to a card detect switch 206 and card contacts 208. The card contacts 208 are configured to provide electrical connectivity between the contact pads of an integrated circuit enabled payment object and the chip card interface 204. Furthermore, the card detect switch 206 is configured to indicate when an integrated circuit payment object is inserted into reader 200. The card detect switch 206 may be any suitable electrical or mechanical switch, and in some implementations may be integrated with the card contacts 208. In situations where the card detect switch 206 indicates that an integrated circuit payment object has been inserted into reader 200, the chip card reader interface 204 may be configured to read data from the integrated circuit payment object via the card contacts 208.

The reader 200 may also include a near field communication (NFC) microcontroller 210. The NFC microcontroller 210 is configured to manage the transmission and reception of near field communications through control of a NFC antenna 218. In instances where it is desired to read a NFC enabled payment object, or a NFC enabled payment object (e.g., certain buyer devices 128 or payment cards 130, 132) is determined to be in proximity to reader 200, NFC microcontroller 210 may be configured to drive the NFC antenna 218 (e.g., via a driving circuit) to induce a magnetic field capable of being modulated by the NFC enabled payment object. From here, the modulated magnetic field signal may be converted into a digital signal that NFC microcontroller 210 can interpret. On the other hand, when it is desired to transmit data via the NFC antenna 218, the NFC microcontroller 210 may be configured to transmit data using the NFC protocol by modulating (e.g., via a modulator) the magnetic field to which the NFC antenna 218 is operatively coupled.

In some implementations, the NFC microcontroller and/or NFC antenna may be disabled by the microcontroller 202. For example, the microcontroller 202 may disable NFC functionality on the reader 200 when a buyer 126 wishes to use an application or device that does not support NFC tap-to-pay payments.

To supply power to the components within the reader 200, a power system 226 is provided. In some implementations, the power system 226 may include a battery. Coupled to the power system 226 is a USB micro interface 228 configured to receive a USB micro jack, although other types of connectors are anticipated. In certain implementations, connection of a jack to USB micro interface 228 can activate a switch within the power system 226 to override power supplied by the battery. This allows for battery power to be conserved for situations where external power cannot be provided. Furthermore, the power system 226 may also include a battery charger to allow the battery to be charged when external power is supplied via USB micro interface 228. Payment device 200 also includes wake-up electronics 230 configured to wake-up the device from a low-power state to an active state in response to detection of a payment object, e.g., in response to detection of a wireless signal, acceleration, proximity, etc. In some implementations, the wake-up electronics 230 can also power down payment device 230 to a low-power state after a predetermined amount of time or after completion of a communication.

The reader 200 illustrated in FIG. 2 further contains a wireless radio consisting of a wireless interface 222 and a wireless antenna 224 to enable wireless communications between the reader 200 and a merchant device 116, a buyer device 128, or other components if the system 100 as described herein. In some implementations the wireless interface 222 and wireless antenna 224 may enable communication over the Bluetooth® protocol. In some implementations, the wireless interface 222 and wireless antenna may be a cellular radio, Wi-Fi radio, or any other wireless radio. It should be understood that, although only a single wireless interface 222 and wireless antenna 224 are illustrated in FIG. 2, other implementations are possible. For example, the reader 200 may include a one or more Bluetooth® radios, Wi-Fi radios, etc.

In addition, the reader 200 may include an anti-tamper module 220 configured to prevent unauthorized tampering with the device and possible theft or interception of payment information. The reader 200 also includes user interfaces 232 to enhance the user experience. The user interfaces 232 can include, but are not limited to, LED indicators, buttons and speakers. In some implementations, speakers and LED indicators can be used to present audio and visual identifiers of transaction and device status. In addition, buttons may be configured to power the reader 200 on or off, operate the device or reset the device.

FIG. 2 also illustrates example sensors useful in informing device 200 about its current environment, use, or state. Accelerometer 236 can be used to detect motion of the device 236. In some implementations, detected motion (acceleration), or lack of detected motion can be interpreted by microcontroller 202 to conclude that device 200 is stationary; was stationary and is now in motion, which may indicate it is being moved toward a buyer; was in motion and now is stationary, which may indicate that the device is now in a new environment, or quick changes in motion might indicate the device is in a merchant's pocket, and the device can go into standby mode. Similarly, proximity detector 234, can be used to determine that a payment object is coming within range of the antenna, which can be used to activate the chip card reader interface 204. Both sensors can also be used to wake the device from a low power state. In some implementations, the entire device can be powered up upon detection of movement or card proximity by the accelerometer or proximity sensor, respectively, or selected subsystems can be powered.

Figure 3:
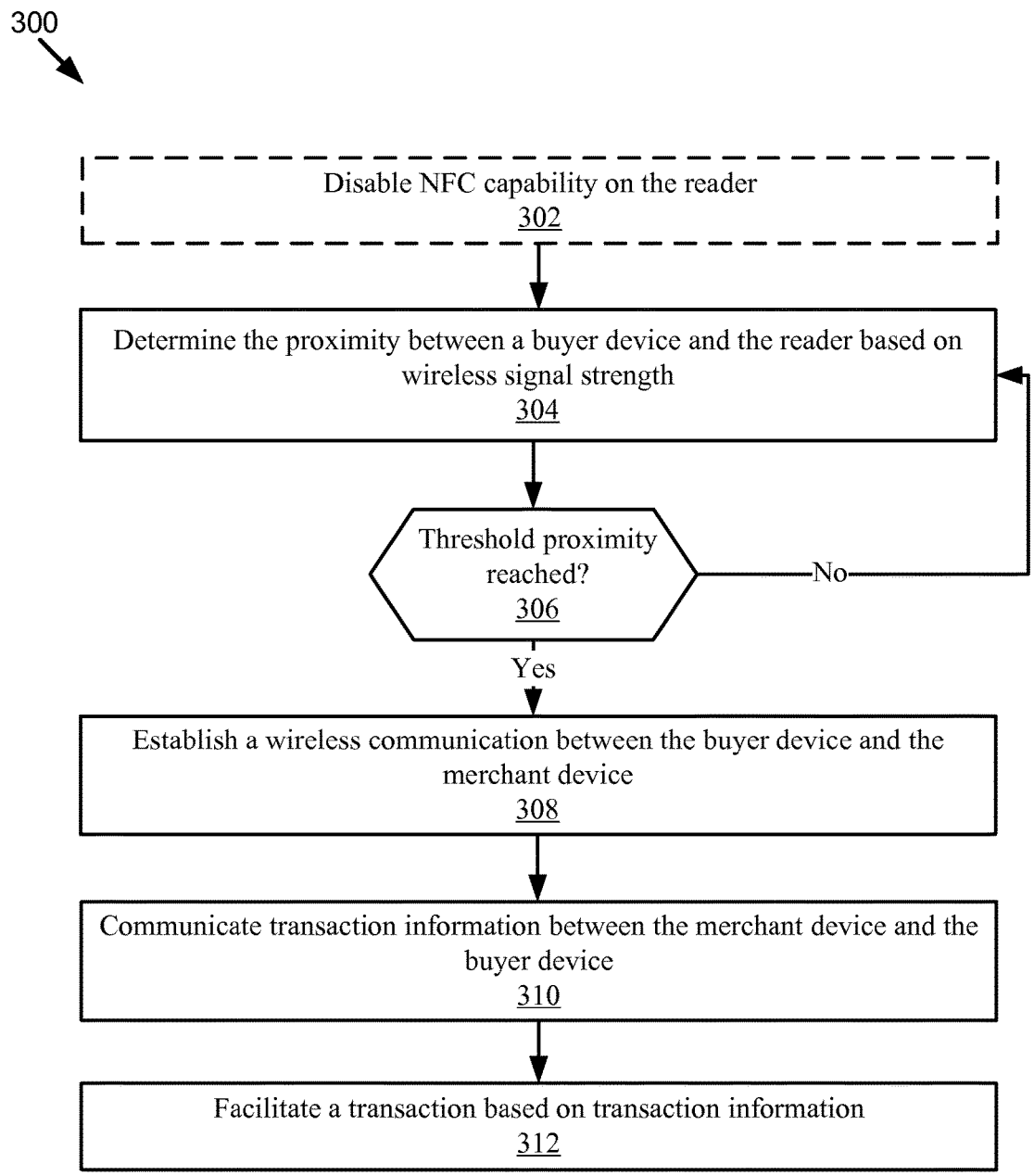
FIG. 3 is a block diagram of an example process for simulating an NFC experience.

FIG. 3 is a block diagram of an example process 300 for simulating an NFC experience. At 302, the reader 120 may optionally disable its NFC capability. For example, if the reader 120 is equipped with NFC capability, the NFC capability may interfere with a simulated NFC experience, by taking over a communication from the buyer device 128. It should be understood that, in some implementations, the buyer application 136 alternatively or additionally disables the NFC capability in the buyer device 128.

At 304, one or more components of the payment communication system 100 determines the proximity between a buyer device 128 and a reader 120 using wireless signal strength. In some instances, a signal may include information about the signal such as the power at which it was broadcast, information describing the source of the signal, etc. A listening device (e.g., the buyer device 128 or the reader 120) may measure a received signal strength from a transmitting device (e.g., the buyer device 128 or the reader 120) and may determine the proximity of the transmitting device to the listening device. For example, the listening device may determine the proximity of the transmitting device to the listening device using the measured received signal strength and information about the signal including the broadcast power. At 306, the listening device determines whether a threshold proximity has been reached. For example, the buyer device 128 or the reader 120 may compare the determined proximity to a threshold proximity for a payment transaction to take place (e.g., 10 cm). In some embodiments, the one or more components of the payment communication system 100 may determine whether a threshold signal strength has been reached rather than calculating a proximity based on the signal strength and determining whether a threshold proximity has been reached.

At 308, the merchant device 116 and the buyer device 128 establish a wireless communication channel. In some instances, the wireless communication channel between the merchant device 116 and the buyer device 128 is a direct communication channel, while in others the wireless communication channel is indirect and may be established via an intermediary device (e.g., a wireless router, the reader 120, or the like) or a network (e.g., a local area network, the Internet, or the like).

At 310, transaction information and/or payment information is communicated between the buyer device 128 and the merchant device 116 via the wireless communication channel. At 312, the payment processing system facilitates a transaction based on the transaction information. For example, the merchant application 118 running on the merchant device 116 may receive the payment information from the buyer device 128 and transmit the payment information, to the payment processing system 102 for processing.

FIG. 4A is a data flow diagram depicting an example data flow 400a among a merchant device 116, a reader 120, a buyer device 128, a network 114, and a payment processing system 102 according to one implementation. In the example of FIG. 4A, the merchant device 116 communicates with the reader 120 via wireless connection 402. For example, the merchant device 116 sends a signal to the reader 120 to simulate an NFC experience for a buyer device 128. In some implementations, the merchant application 118 running on merchant device 116 receives a user input to initiate a transaction using a simulated NFC experience. It should be understood, however, simulating an NFC experience can be initiated in response to other impetuses. For example, simulating an NFC experience may be initiated in response to the merchant device 116 receiving a wireless signal broadcast by the buyer device 128. Similarly, the reader 120 may receive a wireless signal from the buyer device 128 and automatically initiate the simulated NFC experience.

The reader 120 and buyer device 128 cooperate to determine the proximity 404 between the reader 120 and the buyer device 128 based on a signal strength of a wireless signal. For example, in one embodiment, the reader 120 listens to a wireless signal transmitted by the buyer device 128 and transmits the measured received signal strength to either the merchant device 116 or the buyer device 128. The merchant device 116 or buyer device may then determine a proximity of the buyer device 128 to the reader 120 using the signal strength as described above. In another implementation, the reader 120 may determine the proximity between the reader 120 and the buyer device 128 by calculating the proximity using the received signal strength and the power of the signal as transmitted by the buyer device 128 (e.g., the transmission power may be included in information broadcast in the signal). It should be understood that, while described as the reader 120 receiving a signal from the buyer device 128 to determine proximity, the reader 120 may broadcast a signal and the buyer device 128 may measure the signal strength.

A wireless communication channel may be established between the buyer device 128 and the merchant device 116. The wireless communication channel may be initiated by either the buyer device 128 or the merchant device 116 and may occur before or in response to a threshold proximity between the buyer device 128 and the reader 120 being reached. The wireless communication channel may be a direct wireless connection or may include an intermediary device. For example, the wireless connection may be a Bluetooth® connection, an ad hoc Wi-Fi connection, or may use some other wireless communication technology configured to connect two computing devices directly (e.g., the buyer device 128 and merchant device 116 may establish the wireless connection over a network, such as a local area network, the Internet, or the like).

In some implementations, to establish the wireless communication channel, the reader 120 transmits an instruction to the buyer device 128 to connect to the merchant device 116 using information identifying the merchant device 116. Information identifying the merchant device 116 may include information that would allow the buyer device 128 to establish the communication channel with the merchant device 116, such as a wireless address (e.g., a Bluetooth® address, IP address, etc.), data describing a merchant (e.g., merchant account number, merchant device id, etc.), or the like.

In other implementations, to establish the wireless communication channel, the reader 120 transmits information identifying the buyer device 128 to the merchant device 116. The merchant device 116 may use the information identifying the buyer device 128 to establish the wireless communication channel with the buyer device 128. In one embodiment, the reader 120 may determine the information identifying the buyer device 128 from the wireless connection 402 between the buyer device 128 and the reader 120.

In response to the proximity between the buyer device 128 and the reader 120 crossing (e.g., exceeding or falling below) a predetermined threshold (e.g., 10 cm), the buyer device 128 sends payment information 406 to the merchant device 116. Once the merchant device 116 receives the payment information from the buyer device 128, the merchant device 116 transmits transaction information 408 via the network 114 to the payment processing system 102. The payment processing system 102 receives and processes the transaction information 410 as described elsewhere herein to complete the financial transaction between the merchant and the buyer.

FIG. 4B is a data flow diagram depicting an example data flow 400b among a merchant device 116, a reader 120, a buyer device 128, a network 114, and a payment processing system 102 according to one implementation. In the example of FIG. 4B, the merchant device 116 communicates with the reader 120 via wireless connection 422. For example, the merchant device 116 may send a signal to the reader 120 via wireless connection 422 to initiate a simulated NFC experience for a buyer device 128 as described above with reference to FIG. 4A.

Additionally, the reader 120 and the buyer device 128 may establish a wireless communication channel through which a signal strength based proximity 424 and payment information 426 may be transmitted. In some embodiments, the wireless communication channel between the reader 120 and the buyer device 128 may exist concurrently with the wireless connection 422 between the reader 120 and the merchant device 116. As described above, the reader 120 and buyer device 128 may cooperate to determine the proximity 424 between the reader 120 and the buyer device 128 based on a wireless signal strength.

In response to the proximity crossing a predetermined threshold, the buyer device 128 sends payment information 426 to merchant device 116 via the reader 120. It should be understood that in some implementations, the buyer device 128 may send the payment information prior to the proximity exceeds the predetermined threshold and payment is authorized in response to the proximity threshold being exceeded. Additionally, the buyer app 136 running on the buyer device 128 may request verification by the buyer in some implementations. For example, a buyer may tap a buyer device 128 on the reader 120 (thereby crossing the threshold) as well as confirm payment using the buyer device 128 (e.g., by interacting with a graphical user interface element, scanning a finger print on a finger print reader of the buyer device 128, etc.).

In the example of FIG. 4B, the reader 120 is configured to communicate with both the merchant device 116 and the buyer device 128. In some instances, the reader 120 may have two wireless radios (e.g., two Bluetooth® radios, a Bluetooth and a Wi-Fi radio, etc.), which communicate with both the merchant device 116 and buyer device 128 simultaneously. In some instances, the reader 120 may be capable of multiplexing or switching back and forth between wireless communication channels in order to maintain a connection with the merchant device 116 while also communicating with the buyer device 128 using a single wireless radio.

Once the merchant device 116 receives the payment information 428 from the buyer device 128, the merchant device 116 transmits transaction information 430 via the network 114 to the payment processing system 102. The payment processing system 102 may then process the transaction information 432 to complete the financial transaction between the merchant and the buyer as described elsewhere herein.

FIG. 4C is a data flow diagram depicting an example data flow 400c among a merchant device 116, a reader 120, a buyer device 128, a network 114, and a payment processing system 102. In the example of FIG. 4C, the merchant device 116 communicates with the reader 120 via wireless connection 452. For example, the merchant device 116 may send a signal to the reader 120 via wireless connection 452 to initiate a simulated NFC experience for a buyer device 128 as described above with reference to FIG. 4A.

The reader 120 and buyer device 128 cooperate to determine the proximity 454 between the reader 120 and the buyer device 128 based on a wireless signal strength as described in reference to FIG. 4A, FIG. 4B, and elsewhere herein.

In response to the proximity crossing a predetermined threshold, the buyer device 128 sends payment information 456 to the payment processing system 102. In some implementations, the buyer device 128 sends payment information 456 via the network 114 directly to the payment processing system 102. The payment process system 102 may then transmit a payment confirmation and/or a request for additional transaction information from the merchant device 116. In some implementations, the buyer device 128 transmits the payment information 456 to the merchant device 116 over the network 114 and the merchant device 116 then transmits transaction information 458 to the payment processing system 102 via the network 114. The network 114 may include, for example, a cellular network, a local area network, the Internet, and or any other network capable of facilitating communication between the buyer device 128, the merchant device 116, and the payment processing system 102.

Upon receiving the transaction information 460 (including payment information 456) from the merchant device 116 and/or the buyer device 128, the payment processing system 102 processes the payment as described elsewhere herein.

Figure 5:
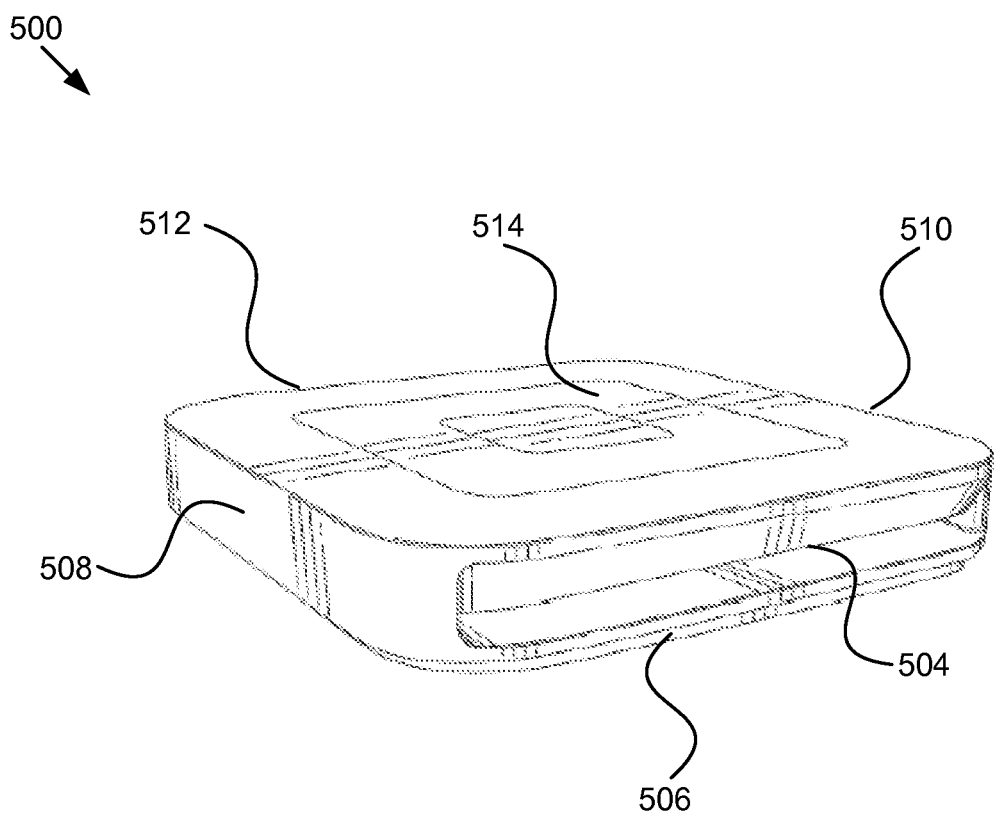
FIG. 5 illustrates an example perspective view of a reader device with a slot for receiving card type payment objects.

FIG. 5 illustrates an example perspective view of a reader device 500 with a slot 504 for receiving card type payment objects in accordance with at least some implementations of the reader 120 described herein. In some implementations, more than one slot can be provided. The reader device 500 can include a first surface 506, a side surface 508, an opposing side surface 510 and a second surface 512. The reader device 500 can also include a front face 510 and an opposing back face (not shown). In the example of FIG. 5, the reader device 500 has a frame that is shaped as a thin parallelepiped, e.g., the width of the frame (along the first surface 506) is at least five or ten times the height (along the side surface 510) in some implementations. The front face 514 and bottom face can be generally shaped as a square or rectangle, e.g., a square or rectangle with rounded edges.

For example, the first surface 506 can include one or more openings that receive cards through, respectively, one or more card interfaces. In the example of FIG. 5, the reader device 500 has a single slot 504, although a plurality of slots are possible and contemplated herein. The single slot 504 includes one or more card interfaces. For example, the card interface can include an IC chip reader circuitry for receiving IC payment objects and/or magnetic stripe reader circuitry for receiving magnetic payment objects. Magnetic stripe reader circuitry may include magnetic read heads positioned to read the magnetic information on the stripe of the card as it is being swiped, and IC chip reader circuitry may include electrical contacts positioned to electrically engage contacts on the IC chip card when it is inserted.

The reader device 500 can include circuitry configured to direct signals from the one or more card interfaces, to communicate wirelessly with a computing device, and to efficiently power the reader device 500. The slot 504 may extend across part, but not all of the width of the frame, leaving one or more thin sidewalls to constrain the lateral position of a payment card as it is inserted into the slot 504 and to prevent rotation of the card while in the slot. The chip reader interface, including electrical contacts positioned to electrically engage the contacts on the chip card when it is inserted, are positioned in the slot 504.

In some implementations, the chip reader interface in slot 504 is configured to receive an external adapter through electrical contacts in reader device 500. The external adapter can provide power to recharge the reader device 500, e.g., by engaging the electrical contacts within slot 504 of the reader device 500. The external adapter can connect the chip reader interface to a USB port or power supply. The external adapter can also provide software updates to the reader device 500.

The reader device 500 can also include components as shown in FIG. 2. The reader device 500 can include circuitry configured to direct signals from one or more card interfaces, to communicate wirelessly with a computing device (e.g., the merchant device 116 or the buyer device 128), and to efficiently power the reader device 500.

Figure 6:
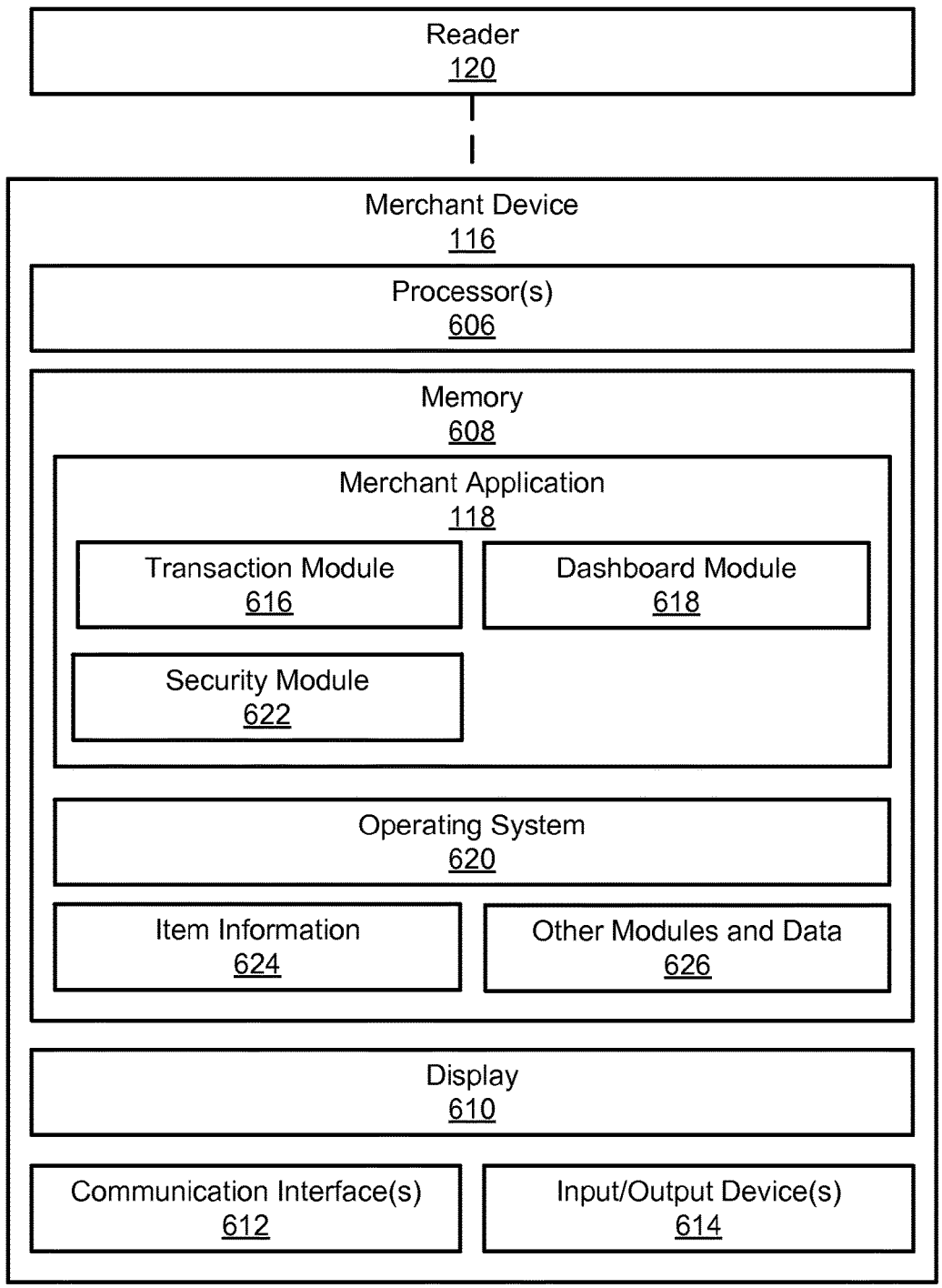
FIG. 6 is a block diagram illustrating select components of an example merchant POS system.

FIG. 6 is a block diagram illustrating select components of an example merchant POS system according to some implementations. A merchant device 116 can be the merchant device 116 shown in FIG. 1, for example. The merchant device 116 can be any suitable type of computing device, e.g., portable, semi-portable, semi-stationary, or stationary device.

In the example of FIG. 6, the merchant device 116 includes at least one processor 606, a memory 608, one or more communication interfaces 612, and one or more input/output (I/O) devices 614. Each processor 606 can itself comprise one or more processors or processing cores. For example, the processor 606 can be implemented as one or more microprocessors, microcomputers, microcontrollers, digital signal processors, central processing units, state machines, logic circuitries, and/or any devices that manipulate signals based on operational instructions. In some implementations, the processor 606 can be one or more hardware processors and/or logic circuits of any suitable type specifically programmed or configured to execute the algorithms and processes described herein by performing various input/output, logical, and/or mathematical operations. The processor 606 can be configured to fetch and execute computer-readable processor-executable instructions stored in the memory 608.

Other components included in the merchant device 116 can include various types of sensors (not shown), which can include a GPS device, an accelerometer, gyroscope, compass, proximity detector, and the like. Additionally, the merchant device 116 can include various other components that are not shown, examples of which include removable storage, a power source, such as a battery and power control unit, and so forth.

Depending on the configuration of the merchant device 116, the memory 608 can be non-transitory computer storage media (e.g., computer-readable media) and can include volatile and nonvolatile memory and/or removable and non-removable media implemented in any type of technology for storage of information such as computer-readable processor-executable instructions, data structures, program modules or other data. The memory can include, but is not limited to, RAM, ROM, EEPROM, flash memory, solid-state storage, magnetic disk storage, optical storage, and/or other computer-readable media technology. Further, in some cases, the merchant device 116 can access external storage, such as RAID storage systems, storage arrays, network attached storage, storage area networks, cloud storage, or any other medium that can be used to store information and that can be accessed by the processor 606 directly or through another computing device or network. Accordingly, the memory 608 can be computer storage media able to store instructions, modules or components that can be executed by the processor 606.

Each merchant device 116 may include an instance of a merchant application 118 executed on the merchant device. For example, the merchant application 118 may be a register application that may provide POS functionality to enable the merchant to accept payments at a POS location using the merchant device 116 as a mobile POS terminal. Accordingly, the merchant 122 and the buyer 126 may conduct a POS transaction 124 by which the buyer 126 acquires an item or service from the merchant 122 at a POS location. The merchant application 118 on the merchant device 116 may send transaction information to the payment processing system 102 (e.g., as the transaction is being conducted at the POS location). In some implementations, such as if a particular merchant device 116 is not connected to the network 114 and is therefore processing transactions offline, the transaction information may be sent in a batch at a subsequent point in time or using other suitable techniques. In some implementations, the transaction information may be sent via SMS, MMS, or a voice call.

To accept electronic payments for POS transactions, the merchant typically creates a merchant account on the payment processing system 102 by providing information describing the merchant including, for example, merchant name, contact information (e.g., telephone numbers, the merchant's address, and one or more financial accounts to which funds collected from buyers will be deposited). This merchant information can be securely stored by the service provider, for example, as merchant account information in a secure database. Further, the merchant information may include a merchant profile created for each merchant. The merchant profile may include information about the merchant and transaction information associated with transactions conducted by the merchant.

The memory 608 can be used to store and maintain any number of functional components or modules that are executable by the processor 606. In some implementations, these functional components comprise instructions or programs that are executable by the processor 606 and that, when executed, implement operational logic for performing the actions and services attributed above to the merchant device 116. Functional components of the merchant device 116 stored in the memory 608 can include a transaction module 616, a dashboard module 618, and a security module 622, although it can also contain modules or portions of modules assigned herein to the payment processing system 102. The transaction module 616, dashboard module 618, and security module 622 can all be a part of a merchant application, for example merchant application 118, running on merchant device 116. The transaction module 616, for example, presents an interface, such as a payment interface to enable the merchant to conduct transactions, receive payments, and so forth, as well as for communicating with the payment processing system 102 for processing payments and sending transaction information. The dashboard module 618 enables the merchant to manage the merchant's account, the merchant profile, merchant preferences, view saved or new pricing information, communicate with the payment processing system 102 regarding cash advances, offers of incentives, invitations, and the like. The security module 622 enables the merchant application to encrypt and decrypt transaction information communicated between the merchant device 116 and other system components, such as the reader 120, a payment processing system 102, or a buyer device 128 or application, etc. Additional functional components can include an operating system 620 for controlling and managing various functions of the merchant device 116 and for enabling basic user interactions with the merchant device 116.

In addition, the memory 608 can also store data, data structures, and the like, that are used by the functional components. For example, data stored by the memory 608 can include item information 624 that includes information about the items offered by the merchant, which can include a list of items currently available from the merchant, images of the items, descriptions of the items, prices of the items, and so forth. For instance, when the merchant 122 is setting up the merchant application 118 to accept payments for particular items offered by the merchant 122, the merchant can enter the item information 624 for the particular items. Depending on the type of the merchant device 116, the memory 608 can also optionally include other functional components and data, such as other modules and data 626, which can include programs, drivers, etc., and the data used or generated by the functional components. Further, the merchant device 116 can include many other logical, programmatic and physical components, of which those described are merely examples that are related to the discussion herein.

The communication interface(s) 612 can include one or more interfaces and hardware components for enabling communication with various other devices (e.g., a payment processing system, a reader, and/or a buyer device), such as over the network(s) 114 or directly. For example, communication interface(s) 612 can enable communication through one or more of the internet, cable networks, wireless networks (e.g., Wi-Fi) and wired networks, as well as close-range communications such as Bluetooth®, Bluetooth® low energy, and the like, as additionally enumerated elsewhere herein.

In another implementation, the communication interface(s) 612 can include a cellular communications transceiver for sending and receiving data over a cellular communications network such as via voice call, short messaging service (SMS), multimedia messaging service (MMS), hypertext transfer protocol (HTTP), direct data connection, WAP, e-mail or another suitable type of electronic communication. The communication interface(s) 612 also provides other conventional connections to the network 114 for distribution of files and/or media objects using standard network protocols such as TCP/IP, HTTP, HTTPS and SMTP as will be understood.

The merchant device 116 can further include a display 610, which can employ any suitable display technology. For example, the display 610 can be a liquid crystal display, a plasma display, a light emitting diode display, an OLED (organic light-emitting diode) display, an electronic paper display, or any other suitable type of display able to present digital content thereon. In some implementations, the display 610 can have a touch sensor associated with the display 610 to provide a touchscreen display configured to receive touch inputs for enabling interaction with a graphical user interface presented on the display 610. Accordingly, implementations described herein are not limited to any particular display technology. Alternatively, in some implementations, the merchant device 116 might not include the display 610, and information can be presented by other means, such as aurally.

The merchant device 116 can further include one or more I/O devices 614. The I/O devices 614 can include speakers, a microphone, a camera, and various user controls (e.g., buttons, a joystick, a keyboard, a keypad, etc.), a haptic output device, and so forth.

In addition, the merchant device 116 can include or can be connectable to a reader 120. In some implementations, the reader 120 can plug in to a port in the merchant device 116, such as a microphone/headphone port, a data port, or other suitable port, or can communicate via wireless connection (e.g., Bluetooth®, Wi-Fi, etc.) to the merchant device and may additionally or alternatively communicate with the buyer device 128, as discussed elsewhere herein. The reader 120 can include a card interface for reading a magnetic stripe or an integrated circuit of a payment card and further can include encryption technology for encrypting the information read from the payment object (e.g., payment card, buyer device, etc.). Alternatively, numerous other types of readers 120 can be employed with the merchant devices 116 herein, depending on the type and configuration of the merchant device 116.

Figure 7:
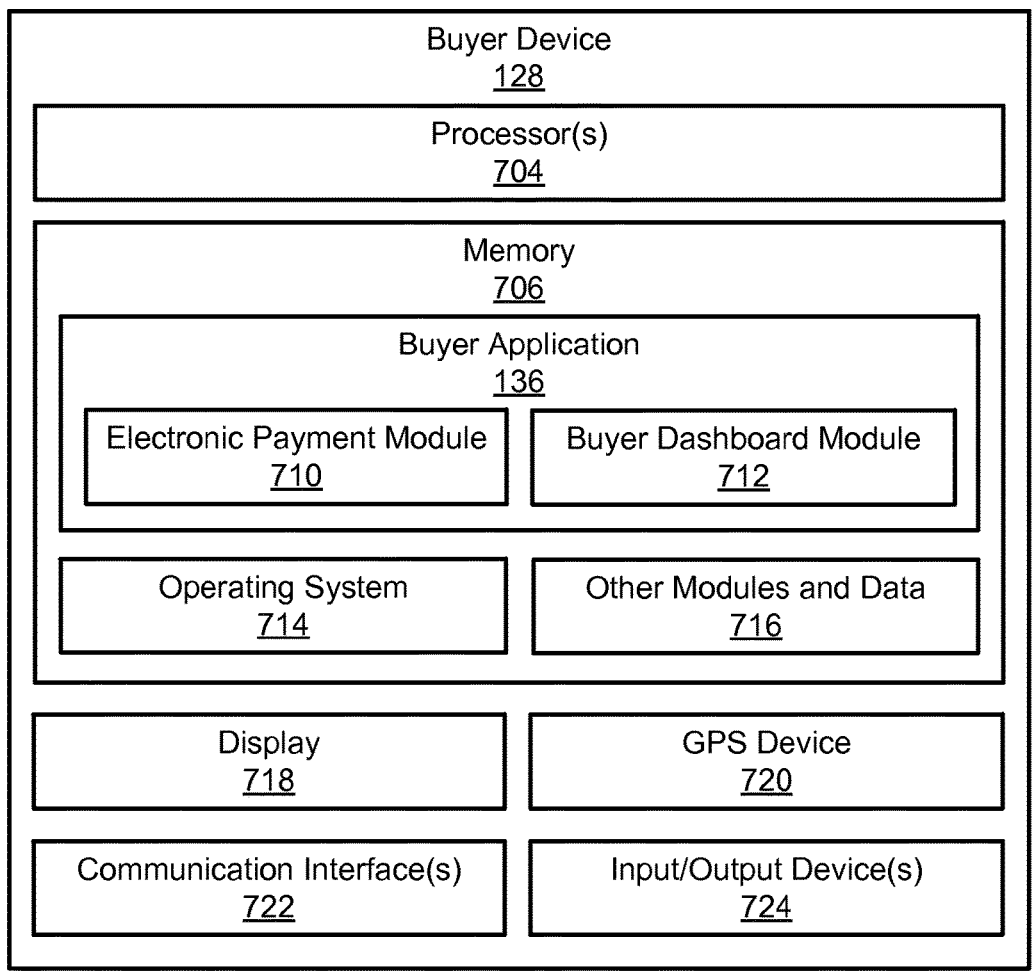
FIG. 7 illustrates select components of an example buyer device.

FIG. 7 illustrates select example components of a buyer device 128 that may implement the functionality described above according to some examples. The buyer device 128 may be any of a number of different types of portable computing devices. Some examples of the buyer device 128 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein.

In the example of FIG. 7, the buyer device 128 includes components such as at least one processor 704, one or more memory 706, the one or more communication interfaces 722, and one or more input/output (I/O) devices 724. Each processor 704 may itself comprise one or more processors or processing cores. For example, the processor 704 can be implemented as one or more microprocessors, microcomputers, microcontrollers, digital signal processors, central processing units, state machines, logic circuitries, and/or any devices that manipulate signals based on operational instructions. In some cases, the processor 704 may be one or more hardware processors and/or logic circuits of any suitable type specifically programmed or configured to execute the algorithms and processes described herein. The processor 704 can be configured to fetch and execute computer-readable processor-executable instructions stored in the memory 706.

Depending on the configuration of the buyer device 128, the computer readable media 706 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 706 may include, but is not limited to, RAM, ROM, EEPROM, flash memory, solid-state storage, magnetic disk storage, optical storage, and/or other computer-readable media technology. Further, in some cases, the buyer device 128 may access external storage, such as RAID storage systems, storage arrays, network attached storage, storage area networks, cloud storage, or any other medium that can be used to store information and that can be accessed by the processor 704 directly or through another computing device or network. Accordingly, the memory 706 may be computer storage media able to store instructions, modules or components that may be executed by the processor 704. Further, when mentioned, non-transitory memory excludes media such as energy, carrier signals, electromagnetic waves, and signals per se.

The memory 706 may be used to store and maintain any number of functional components that are executable by the processor 704. In some implementations, these functional components comprise instructions or programs that are executable by the processor 704 and that, when executed, implement operational logic for performing the actions and services attributed above to the buyer device 128. Functional components of the buyer device 128 stored in the memory 706 may include the buyer application 136, as discussed above. In particular, the buyer application 136 allows a buyer device 128 to connect with one or more of the merchant device 116, payment processing system 102, and reader 120, as discussed herein. In this example, the buyer application 136 includes a buyer dashboard module 712 and an electronic payment module 710 that uses an electronic payment account of the buyer for making electronic payments for transactions. For example, the buyer dashboard module 712 may present the buyer with an interface for managing the buyer's account, changing information, changing preferences, requesting a simulated NFC experience, and so forth. Additional functional components may include an operating system 714 for controlling and managing various functions of the buyer device 128 and for enabling basic user interactions with the buyer device 128.

In some cases, an electronic payment account of the buyer may be linked to one of the buyer's payment objects, such as a credit card. Accordingly, the buyer application 136 may enable the buyer to pay for a transaction with the linked credit card without having to produce the credit card, thereby enabling a card-less payment to the merchant with the credit card. The buyer application 136 and the corresponding electronic payment account, can be associated with various buyer information including, for example, the buyer's name, information describing the payment card linked to the electronic payment account, and an email address linked to the electronic payment account to which receipts can be sent for electronic payment transactions that are conducted by the buyer using the buyer application 136. Further, as an alternative to linking the electronic payment account to a credit card, the electronic payment account may be a different type of account, such as a checking account, a debit account, a savings account, a prepaid account having a prepaid quantity of money deposited therein, or the like.

In addition, the memory 706 may also store data, data structures and the like, that are used by the functional components. Depending on the type of the buyer device 128, the memory 706 may also optionally include other functional components and data, such as other modules and data 716, which may include applications, programs, drivers, etc., and the data used or generated by the functional components. Further, the buyer device 128 may include many other logical, programmatic and physical components, of which those described are merely examples that are related to the discussion herein.

The communication interface(s) 722 may include one or more interfaces and hardware components for enabling communication with various other devices, such as over the network(s) 114 or directly. For example, communication interface(s) 722 may enable communication through one or more of the Internet, cable networks, cellular networks, wireless networks (e.g., Wi-Fi) and wired networks, as well as close-range communications such as Bluetooth®, Bluetooth® low energy, NFC, and the like, as additionally enumerated elsewhere herein.

FIG. 7 further illustrates that the buyer device 128 may include a display 718. Depending on the type of computing device used as the buyer device 128, the display may employ any suitable display technology. For example, the display 718 may be a liquid crystal display, a plasma display, a light emitting diode display, an OLED (organic light-emitting diode) display, an electronic paper display, or any other suitable type of display able to present digital content thereon. In some examples, the display 718 may have a touch sensor associated with the display 718 to provide a touchscreen display configured to receive touch inputs for enabling interaction with a graphic interface presented on the display 718. Accordingly, implementations herein are not limited to any particular display technology. Alternatively, in some examples, the buyer device 718 may not include a display.

The buyer device 128 may further include the one or more I/O devices 724. The I/O devices 724 may include speakers, a microphone, a camera, and various user controls (e.g., buttons, a joystick, a keyboard, a keypad, etc.), a haptic output device, and so forth.

Other components included in the buyer device 128 may include various types of sensors, which may include a GPS device 720 able to indicate location information, as well as other sensors (not shown) such as an accelerometer, gyroscope, compass, proximity sensor, and the like. Additionally, the buyer device 128 may include various other components that are not shown, examples of which include removable storage, a power source, such as a battery and power control unit, and so forth.

Figure 8:
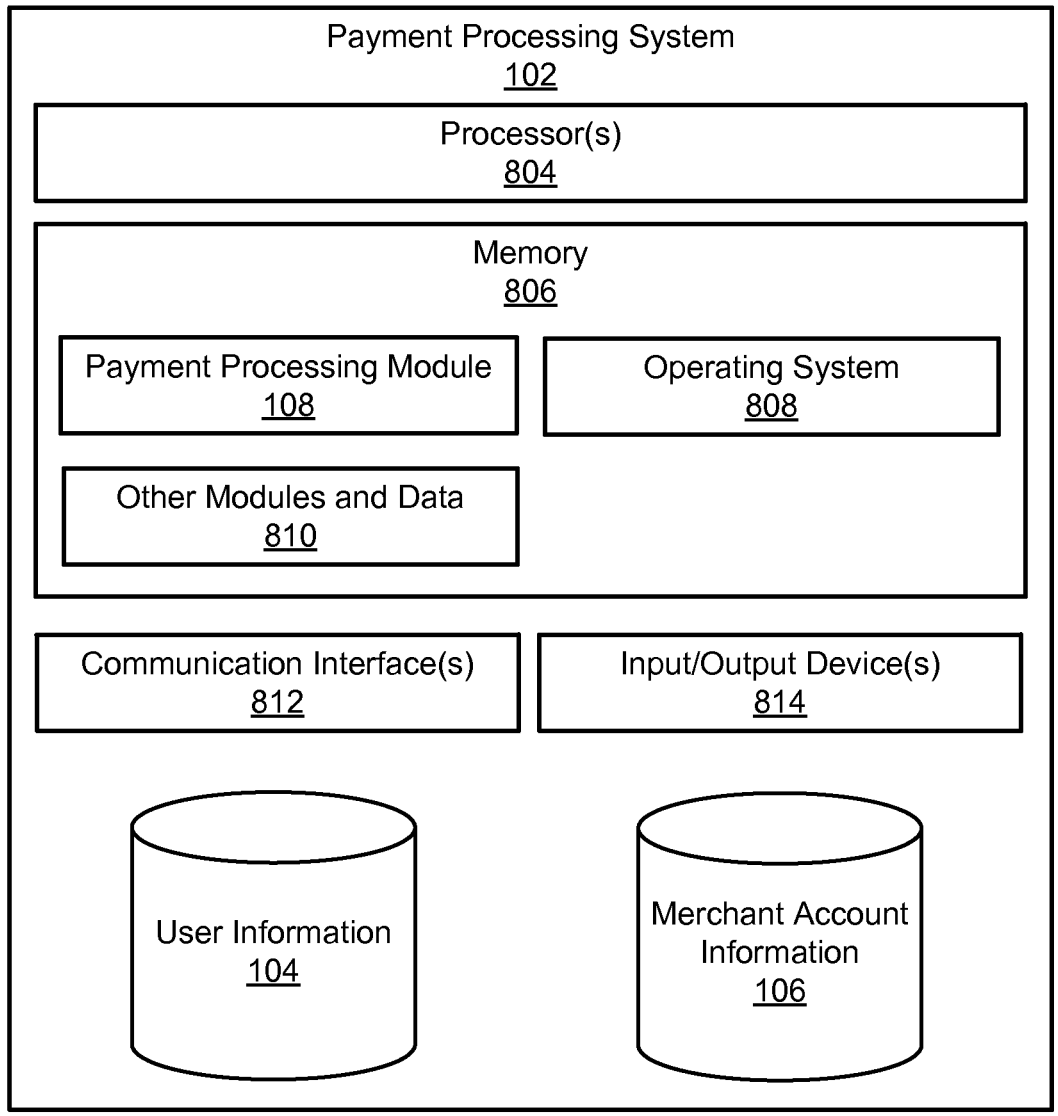
FIG. 8 is a block diagram illustrating select components of an example payment processing system.

FIG. 8 is a block diagram illustrating select components of an example payment processing system 102 according to some implementations. The payment processing system 102 can be any suitable type of computing device capable of sending communications and performing the functions according to the techniques described herein and can be operated by a service provider that provides the payment processing service. For instance, in the case of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the examples herein illustrate the components and data of the payment processing system 102 as being present in a single location, these components and data can alternatively be distributed across different computing devices and different locations. Consequently, the functions can be implemented by one or more computing devices, with the various functionality described above distributed in various ways across the different computing devices, to collectively implement the payment processing system 102. Multiple payment processing systems 102 can be located together or separately, and organized, for example, as virtual servers, server banks and/or server farms. The described functionality can be provided by the servers of a single entity or enterprise, or can be provided by the servers and/or services of multiple different buyers or enterprises.

In the example of FIG. 8, the payment processing system 102 includes one or more processors 804, one or more memory devices 806, one or more communication interfaces 812, and one or more input/output devices 814. These components can be similar to those described above with reference to FIGS. 1, 6, 7, and elsewhere herein.

The memory 806 can be used to store and maintain any number of functional components or modules that are executable by the processor 804. In some implementations, these functional components comprise instructions or programs that are executable by the processor 804 and that, when executed, implement operational logic for performing the actions and services attributed above to the payment processing system 102. Functional components of the payment processing system 102 stored in the memory 806 can include the payment processing module 108, the operating system 808, and other modules and data 810. These components can be similar to those described with reference to FIG. 1 and elsewhere herein. In addition, the memory 806 can store data used for performing the operations described herein. Thus, the memory 806 could store merchant information 106, including merchant profiles, and user information 104, including buyer profiles. Further, the payment processing system 102 can include many other logical, programmatic and physical components, of which those described above are merely examples that are related to the discussion herein.

For clarity of explanation, in some instances the present technology can be presented as including individual functional blocks including functional blocks comprising devices, device components, steps or routines in a method embodied in software, or combinations of hardware and software.

In some implementations the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of memory that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A point-of-sale (POS) terminal for processing a financial transaction between a buyer and a merchant, the POS terminal comprising:
   a register application running on a first computing device operated by the merchant; and
   a payment object reader coupled with the first computing device, wherein the payment object reader comprises (i) a first communication interface configured to facilitate the transmission of buyer information directly from a payment object via a payment wireless channel and (ii) a second communication interface configured to facilitate communication with the first computing device via a communication wireless channel, the communication wireless channel using a different wireless communication protocol than the payment wireless channel, wherein the payment object reader is configured to use the first communication interface, and wherein the payment object reader further comprises a processor configured to:
   (a) determine proximity of a second computing device operated by the buyer, the determination being made using signal strength of a signal received via the communication wireless channel;
   (b) determine, based on information about the second computing device, that communication with the second computing device should not be performed via the payment wireless channel;
   (c) configure the payment object reader, in accordance with the determination that communication should not be performed via the payment wireless channel, to switch from use of the first communication interface to use of the second communication interface; and
   (d) in response to the proximity of the second computing device crossing a threshold,
      (1) establish a communication session with the second computing device via the second communication interface, and
      (2) transmit a request, via the second communication interface, for transmission of payment information associated with the buyer;
   wherein the register application running on the first computing device is configured to process data from the second computing device to determine transaction information associated with the buyer to facilitate a transfer of funds from the buyer to the merchant.

2. The POS terminal of claim 1, wherein to determine the proximity between the payment object reader and the second computing device, the processor is further configured to:
  receive, by the payment object reader, a transmission strength for the signal received via the communication wireless channel; and
  calculate the proximity between the payment object reader and the second computing device, by using the transmission strength and the strength of the signal received via the communication wireless channel.

3. A point-of-sale (POS) terminal for processing a financial transaction between a buyer and a merchant, the POS terminal comprising:
  a register application running on a first computing device operated by the merchant, wherein the register application is configured to receive payment information from the buyer for facilitating a transfer of funds from the buyer to the merchant; and
  a payment object reader coupled with the first computing device, wherein (a) the payment object reader comprises (i) a first communication interface configured to facilitate the transmission of buyer information directly from a payment object via a payment wireless channel and (ii) a second communication interface configured to facilitate communication with the first computing device via a communication wireless channel, the communication wireless channel using a different wireless communication protocol than the payment wireless channel, wherein the payment object reader is configured to use the first communication interface, and (b) wherein the payment object reader comprises a processor configured to:
    (a) determine, based on information about a second computing device, that communication with the second computing device should not be performed via the payment wireless channel;
    (b) configure the payment object reader, in accordance with the determination that communication should not be performed via the payment wireless channel, to switch from use of the first communication interface to use of the second communication interface;
    (c) determine proximity of the second computing device using signal strength of a signal received via the communication wireless channel; and
    (d) in response to the proximity of the second computing device crossing a threshold, transmit a request, via the second communication interface, to the second computing device to connect with the first computing device for transmission of payment information associated with the buyer; and
  wherein the register application running on the first computing device is configured to
    (1) process data from the second computing device to determine financial information associated with the buyer to facilitate the transfer of funds from the buyer to the merchant, and
    (2) transmit a signal to the payment object reader to disable a near field communication (NFC) capability on the payment object reader in accordance with the determination, by the payment object reader, that communication should not be performed via the payment wireless channel; and
    (3) establish the wireless communication session with the second computing device in response to receiving a user input from the merchant to initiate the financial transaction.

4. A method for processing a financial transaction between a buyer and a merchant on a point-of-sale (POS) terminal, the method comprising:
  determining, by a payment object reader comprising (i) a first communication interface configured to facilitate the transmission of buyer information directly from a payment object via a payment wireless channel and (ii) a second communication interface configured to facilitate communication with a first computing device via a communication wireless channel, a proximity between the payment object reader and a second computing device based on wireless signal strength of a wireless signal conveyed via the communication wireless channel, wherein the communication wireless channel uses a different wireless communication protocol than the payment wireless channel, and wherein the payment object reader is configured to use the first communication interface;
  determining, by the payment object reader, based on information about the second computing device, that communication with the second computing device should not be performed via the payment wireless channel;
  switching, by the payment object reader, in accordance with the determination that communication should not be performed via the payment wireless channel, configuration of the payment object reader from use of the first communication interface to use of the second communication interface;
  in response to a determination that the proximity has exceeded a threshold, sending, by the payment object reader to a first computing device via the second communication interface, instructions to initiate a wireless communication, via the communication wireless channel, between the first computing device and the second computing device, the first computing device running a register application, wherein the register application is configured to receive payment data from the second computing device for facilitating a transfer of funds from the buyer to the merchant;
  receiving, by the first computing device, payment information from the second computing device via the wireless communication; and
  transmitting the payment data received from the second computing device, using the register application, to a payment processing system to facilitate the transfer of funds from the buyer to the merchant.

5. The method of claim 4, wherein determining the proximity between the payment object reader and the second computing device includes monitoring, using the payment object reader, the wireless signal transmitted by the second computing device, and
  wherein the wireless signal includes a signal transmission power and information identifying the second computing device.

6. The method of claim 5, further comprising:
  receiving, by the first computing device, the information identifying the second computing device, wherein the first computing device initiates the wireless communication between the first computing device and the second computing device based on the information identifying the second computing device.

7. The method of claim 4, wherein receiving, by the first computing device, payment information from the second computing device via the wireless communication includes (a) receiving, by the payment object reader, the payment information from the second computing device and (b)

transmitting, by the payment object reader, the payment information to the first computing device.

8. The method of claim 4, wherein receiving, by the first computing device, payment information from the second computing device via the wireless communication includes receiving, by the first computing device, the payment information from the second computing device via a wireless network.

9. The method of claim 4, wherein determining the proximity between the payment object reader and the second computing device includes (a) monitoring, by the payment object reader, the wireless signal and (b) transmitting, by the payment object reader, to the second computing device, information identifying the first computing device; and wherein initiating the wireless communication between the first and second computing devices includes receiving, by the first computing device, from the second computing device, a request to initiate the wireless connection between the first and second computing devices.

10. The method of claim 4, further comprising initiating a wireless communication between the first computing device and the second computing device, wherein the initiating includes initiating a first communication channel between the first and second computing devices; and wherein determining the proximity between the payment object reader and the second computing device based on the wireless signal strength of the wireless signal includes (a) initiating a second communication channel between the payment object reader and the second computing device, (b) measuring, by the payment object reader, the signal strength of the wireless signal used for the second communication channel, and (c) transmitting the measured signal strength from the payment object reader to the second computing device.

11. The method of claim 4, wherein the first communication interface facilitates a near field communication (NFC) capability on the payment object reader.

12. The method of claim 4, wherein the wireless signal is a Bluetooth signal.

13. A method for processing a financial transaction between a buyer and a merchant on a point-of-sale (POS) terminal, the method comprising:

determining, by a payment object reader comprising (i) a first communication interface configured to facilitate the transmission of buyer information directly from a payment object via a payment wireless channel and (ii) a second communication interface configured to facilitate communication with a first computing device via a communication wireless channel, a proximity between the payment object reader and a second computing device based on wireless signal strength of a wireless signal conveyed via the communication wireless channel, wherein the communication wireless channel uses a different wireless communication protocol than the payment wireless channel, and wherein the payment object reader is configured to use the first communication interface;

determining, by the payment object reader, based on information about the second computing device, that communication with the second computing device should not be performed via the payment wireless channel;

transmitting, by the first computing device, in response to (i) the determination that communication should not be performed via the payment wireless channel and (ii) a user input from the merchant to initiate the financial transaction, a signal to the payment object reader to (a) disable a near field communication (NFC) capability on the payment object reader and (b) monitor the communication wireless channel for the wireless signal transmitted by the second computing device;

switching, by the payment object reader, configuration of the payment object reader from use of the first communication interface to use of the second communication interface;

in response to a determination that the proximity has exceeded a threshold, sending, by the payment object reader to a first computing device via the second communication interface, instructions to initiate a wireless communication between the first computing device and the second computing device, the first computing device running a register application, wherein the register application is configured to receive payment data from the second computing device for facilitating a transfer of funds from the buyer to the merchant;

receiving, by the first computing device, payment information from the second computing device via the wireless communication; and transmitting the payment data received from the second computing device, using the register application, to a payment processing system to facilitate the transfer of funds from the buyer to the merchant.

14. A point-of-sale (POS) terminal for processing a financial transaction between a buyer and a merchant, the POS terminal comprising:

a register application running on a first computing device operated by the merchant, wherein the register application is configured to receive payment data from a second computing device via a wireless communication and to transmit the payment data received from the second computing device to a payment processing system to facilitate a transfer of funds from the buyer to the merchant; and a payment object reader coupleable with the first computing device, wherein the payment object reader comprises (i) a first communication interface configured to facilitate the transmission of buyer information directly from a payment object via a payment wireless channel and (ii) a second communication interface configured to facilitate communication with the first computing device via a communication wireless channel, the communication wireless channel using a different wireless communication protocol than the payment wireless channel, wherein the payment object reader is configured to use the first communication interface, and wherein the payment object reader comprises a processor being configured to:

(a) determine a wireless signal strength of a wireless signal received by the communication wireless channel from the second computing device, (b) determine, based on information about the second computing device, that communication with the second computing device should not be performed via the payment wireless channel, and (c) configure the payment object reader, in accordance with the determination that communication should not be performed via the payment wireless channel, to switch from use of the first communication interface to use of the second communication interface;

wherein the payment object reader in response to a determination that the wireless signal strength of the wireless signal has exceeded a threshold, is configured to (1) establish a communication session with the second computing device via the second communication interface and to (2) in conjunction with the second computing device, initiate the wireless communication between the first computing device and the second computing device.

15. The POS terminal of claim 14 further comprising:
determining a proximity between the payment object reader and the second computing device by monitoring the wireless signal strength, wherein the wireless signal is transmitted by the second computing device and includes a signal transmission power and information identifying the second computing device.

16. The POS terminal of claim 15, wherein initiating the wireless communication between the first and second computing devices includes (a) receiving, by the first computing device, the information identifying the second computing device and (b) initiating, by the first computing device, the wireless connection between the first and second computing devices based on the identifying information.

17. The POS terminal of claim 14, wherein receiving payment information from the second computing device via the wireless communication includes (a) receiving, by the payment object reader, the payment information from the second computing device and (b) relaying the payment information to the first computing device.

18. The POS terminal of claim 14, wherein receiving payment information from the second computing device via the wireless communication includes receiving, by the first computing device, the payment information from the second computing device via a wireless network.

19. The POS terminal of claim 14, wherein determining the proximity between the payment object reader and the second computing device includes (a) monitoring, by the payment object reader, the wireless signal and (b) transmitting, by the payment object reader, information identifying the first computing device to the second computing device; and
wherein initiating the wireless communication between the first and second computing devices includes receiving, by the first computing device, a request to initiate the wireless connection between the first and second computing devices from the second mobile computing device.

20. The POS terminal of claim 14 wherein initiating a wireless communication between the first computing device and the second computing device includes initiating a first communication channel between the first and second computing devices; and
wherein determining the proximity between the payment object reader and the second computing device based on the wireless signal strength of the wireless signal includes (a) initiating a second communication channel between the payment object reader and the second computing device, (b) measuring, by the payment object reader, the signal strength of the wireless signal used for the second communication channel, and (c) transmitting the measured signal strength from the payment object reader to the second computing device.

21. A point-of-sale (POS) terminal for processing a financial transaction between a buyer and a merchant, the POS terminal comprising:
a register application running on a first computing device operated by the merchant, wherein the register application is configured to receive payment data from a second computing device via a wireless communication and to transmit the payment data received from the second computing device to a payment processing system to facilitate a transfer of funds from the buyer to the merchant; and
a payment object reader coupleable with the first computing device, wherein (a) the payment object reader comprises (i) a first communication interface configured to facilitate the transmission of buyer information directly from a payment object via a payment wireless channel and (ii) a second communication interface configured to facilitate communication with the first computing device via a communication wireless channel, the communication wireless channel using a different wireless communication protocol than the payment wireless channel, wherein the payment object reader is configured to use the first communication interface, and (b) the payment object reader comprises a processor being configured to determine a wireless signal strength of a wireless signal received by the communication wireless channel from the second computing device;
wherein the payment object reader is configured to (a) determine, based on information about the second computing device, that communication with the second computing device should not be performed via the payment wireless channel, and (b) switch, in accordance with the determination that communication should not be performed via the payment wireless channel, from use of the first communication interface to use of the second communication interface;
wherein the payment object reader, in conjunction with the second computing device, in response to a determination that the wireless signal strength of the wireless signal has exceeded a threshold, is configured to initiate the wireless communication between the first computing device and the second computing device, and
wherein the first computing device is configured to transmit a signal to the payment object reader (a) to disable a near field communication (NFC) capability on the payment object reader and (b) to monitor a wireless communication channel for the wireless signal transmitted by the second computing device, in response to receiving a user input from the merchant to initiate the financial transaction.

22. A payment object reader comprising:
a microcontroller;
a chip card reader interface operably coupled to the microcontroller;
a card detect switch operably coupled to the chip card reader interface;
card contacts operably coupled to the chip card reader interface;
a proximity detector operably coupled to the microcontroller;
an NFC antenna;
a wireless radio interface operably coupled to the microcontroller; and
a wireless radio antenna operably coupled to the wireless radio interface,
wherein communication via the wireless radio interface uses a different wireless communication protocol than communication via the NFC antenna,
wherein the microcontroller configures the payment object reader, in a default configuration, to communicate using the NFC antenna, and
wherein, in response to the proximity detector detecting that a mobile device operated by a buyer is within a threshold range of the wireless radio antenna, the microcontroller (a) receives information about a buyer via the wireless radio antenna, (b) determines, based on the information about the buyer, that communication with the buyer should not be performed via the NFC antenna, (c) re-configures the payment object reader to switch from communication using the NFC antenna to communication using the wireless radio interface, (d) establishes a communication session with the mobile device Via the wireless radio interface, and (e) transmits, via the wireless radio interface, a request to the mobile device to connect with a computing device operated by a merchant.

23. The payment object reader of claim 22, wherein, in a case that the proximity detector detects that a payment object is within a threshold range of the wireless radio antenna, the microcontroller activates the chip card reader interface.

* * * * *